US006546396B1

(12) United States Patent
Borkowski et al.

(10) Patent No.: US 6,546,396 B1
(45) Date of Patent: Apr. 8, 2003

(54) DOCUMENT PROCESSING SYSTEM WITH A MULTI-PLATFORM APPLICATION PROGRAMMING INTERFACE

(75) Inventors: Joseph D. Borkowski, Ann Arbor; Steven Russell, Novi; Thomas L. Bondy, Canton; Weston J. Morris; Craig F. Lapan, both of Livonia, all of MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/993,454

(22) Filed: Dec. 10, 1997

(51) Int. Cl.[7] .............................................. G06F 17/00

(52) U.S. Cl. ...................... 707/102; 709/318; 709/316; 707/103 R; 707/103 Y; 707/103 F

(58) Field of Search .............................. 707/1–206, 500, 707/502, 517–525, 511–516; 709/1–108, 310–332

(56) References Cited

U.S. PATENT DOCUMENTS

| | | | | |
|---|---|---|---|---|
| 5,778,222 A | * | 7/1998 | Herrick et al. ............... | 707/103 |
| 5,778,377 A | * | 7/1998 | Marlin et al. ................. | 707/10 |
| 5,781,905 A | * | 7/1998 | Awane et al. .................. | 707/2 |

OTHER PUBLICATIONS

Liang et al. "An optimization methodology for document structure extraction on Latin character documents", Pattern Analysis and Machine Intelligence, IEEE Transactions on, vol. 23, Issue 7, Jul. 2001, pp. 719–734.*

Yang et al., "Client browsing module for internet collaborations", Systems, Man, and Cybernetics, 2001 IEEE International Conference on, vol. 4, 2001, pp. 2317–2321.*

Newman, "Delivering the correct multimedia in a standards dominated environment", Euromicro Conference, 2001, Proceedings 27th, 2001, pp. 331–335.*

* cited by examiner

Primary Examiner—David Jung
(74) Attorney, Agent, or Firm—Charles A. Johnson; Mark T. Starr

(57) ABSTRACT

A common programming interface for multiple types of document processing systems. An object interface is defined that includes properties, methods, and events that are applicable to multiple types of document processing systems. For a particular document processing system of a particular type, an instance of the object interface is established, and an application program controls overall operations of the document processing system by setting values of properties in the object interface, invoking methods in the object interface, and responding to events reported via the object interface. System specific track drivers handle system specific interface requirements and interact with an application program via an instance of the object interface. The single application programming interface promotes ease of development for application programs and some reuse of code.

43 Claims, 13 Drawing Sheets

APPLICATION STATES TABLE, METHODS

| Methods | Power Off | Powering Up | Powering Off | Idle | Getting Ready | Going Idle | Making Ready to Flow | Ready | Entering | Remove V2° | Read Complete | Process | Wait Process Complete | CLI° | Recover° |
|---|---|---|---|---|---|---|---|---|---|---|---|---|---|---|---|
| CLI Capture° | | | | | | | | | | | X | | | | |
| DocAccept | | | | | | | | | | | X | | | | |
| DocProcess | | | | | | | | | | | X | | | | |
| DocReject° | | | | | | | | | | | X | | | | |
| FlowStart | | | | | | | | X | | | | | | | |
| FlowStop | | | | | | | | | | X | X | | | | |
| GoIdle | | | | | | | | X | | | | | | | |
| GoReadyToProcess | | | | | X | | | | | | | | | | |
| ImageEndOfFile | | | | | | | | X | | | | | | | |
| MakeReadyToFlow | | | | | | | | X | | | | | | | |
| MakeReadyToFlowTerminate | | | | | | | X | | | | | | | | |
| MergeFeed | | | | | | | | | | | X | | X | | |
| MFilmGetLength | | | | | | | | X | | ° | | | ° | | |
| MFilmHorizontalAnnotate | | | | | | | | X | | ° | | | ° | | |
| MFilmSlew | | | | | | | | X | | ° | | | ° | | |
| MFilmVerticalAnnotate | | | | | | | | X | | ° | | | ° | | |
| NVMRead° | ° | ° | ° | ° | ° | ° | ° | ° | ° | ° | ° | ° | ° | ° | ° |
| NVMWrite° | ° | ° | | ° | ° | ° | ° | ° | ° | ° | ° | ° | ° | | |
| PowerDown | | | | X | | | | | | | | | | | |
| PowerUp | X | X | | | | | | | | | | | | | |
| PrintLine° | | | | ° | ° | ° | ° | ° | ° | ° | ° | ° | ° | | |
| Recover° | | | | | | | | | | | | | | | |
| ResumeFeeding | | | | | | | | | | X | X | | | | |
| StkResetPockets | | | | | | | | | | X | ° | ° | ° | ° | ° |

Legend
° = DP 500 Only

FIG. 9

APPLICATION STATES TABLE, EVENTS

| Events | Power Off | Powering Up | Powering Off | Idle | Getting Ready | Going Idle | Making Ready to Flow | Ready | Entering | Remove V2° | Read Complete | Process | Wait Process Complete | CLI° | Recover° |
|---|---|---|---|---|---|---|---|---|---|---|---|---|---|---|---|
| BlackBand | | | | | | | | | X | | | | | | |
| CLICaptured° | | | | | | | | | | | | | | X | |
| DocComplete | | | | | | | | | X | X | X | X | X | X | |
| DocReadComplete | | | | | | | | | X | | | | | | |
| DocRejected° | | | | | | | | | | X | | | | | |
| ExceptionComplete | | X | X | X | X | X | X | X | X | X | X | X | X | | |
| ExceptionInProgress | | X | X | X | X | X | X | X | X | X | X | X | X | | |
| FlowStopped | | | | | | | | | X | | | | | | |
| HopperEmpty | | | | | | | | | X | | | | | | |
| Idle | | | | | X | | | | | | | | | | |
| MachineDead | X | X | X | X | X | X | X | X | X | X | X | X | X | | |
| MakeReadyToFlowComplete | | | | | | | X | | | | | | | | |
| MFilmGetFilmLengthComplete | | | | | | | X | | X | X | | | | | |
| MFilmSkipEvent°° | | | | | | | X | | X | X | | | | | |
| MFilmSkewComplete | | | | | | | X | | X | X | | | | | |
| PoweredDown | | | X | | | | | | | | | | | | |
| PoweredUp | | X | | | | | | | | | | | | | |
| PoweringUp | | X | | | | | | | | | | | | | |
| Readying | | | | | X | | | | | | | | | | |
| ReadyToFlow | | | | | | X | | | | | | | | | |
| ReadyToProcess | | | | | X | | | | | | | | | | |
| RecoveryComplete | | | | | | | | | | | | | | | X |
| RepassVerify | | | | | | | | | X | X | X | X | X | X | |
| StackerButtonPressed° | | | | X | X | X | | X | X | X | X | X | X | X | X |
| Warning | | | | X | X | X | X | X | X | X | X | X | X | X | X |

Legend
° = DP 500 Only
°° = DP 1XXX only

FIG. 10

DOCUMENT PROCESSING SYSTEM WITH A MULTI-PLATFORM APPLICATION PROGRAMMING INTERFACE

COPYRIGHT NOTICE

This patent document includes an Appendix that contains material that is subject to copyright protection. The copyright owner does not object to reproduction of the patent document as it appears in the Patent and Trademark Office patent file or records, but otherwise reserves all copyrights whatsoever.

FIELD OF THE INVENTION

The present invention relates generally to automated document processing systems, and more particularly, to methods for and arrangements of multiple types of document processing systems that share a common application programming interface.

BACKGROUND

Automated document processing systems have been used for a number of years to process checks, remittances, and other forms of documents. Such systems vary in capabilities in terms of document throughput and mechanisms for extracting data. For example, some systems use optical character recognition techniques while other systems use magnetic ink character recognition. Examples of such systems include the DP 30, DP 500, and DP 1800 document processing systems from Unisys Corporation.

Many of today's systems do not share a common lineage. That is, today's systems are successors to systems that were developed in different locations by different engineers using different platforms. As a result, DP30 systems evolved to where application programs ran under the Windows and OS/2 operating system environments, DP 500 systems evolved to where application programs ran in a CTOS environment, and DP 1800 systems evolved to where application programs ran on the Motorola 68000 family of microprocessors.

With multiple types of application environments, it is expensive to develop applications for the various document processing systems because each system requires a programmer having a relatively unique skill-set. To assemble a group of programmers who possesses skills for all three platforms has been found to be difficult. Therefore, separate staffs of programmers have been required for the different platforms. This is expensive for vendors of automated document processing systems, as well as for customers who develop custom applications for different types of systems.

SUMMARY OF THE INVENTION

The present invention is directed to methods for and arrangements of document processing systems that share a common application programming interface. The common programming interface includes an object interface with properties, methods and events. The properties, methods, and events of the object interface are descriptive of multiple types of document processing systems. Instances of the object interface on multiple types of document processing systems provide a common application programming interface on the multiple types of document processing systems.

In a first aspect of the invention, a document processing system is provided with a generalized programming interface for an application program. The system is comprised of: a first document processor having a first set of capabilities that are accessible via a first set of command codes; an object interface having properties, methods, and events for the first document processor, and having properties, methods, and events for a second document processor having a second set of capabilities; and a track driver coupled to the first document processor and to the object interface, configured and arranged to interface with the first document processor and provide selected ones of the first set of command codes to the first document processor in response to methods initiated via the object interface, and in response to status codes returned from the first document processor, report events to an application program via the object interface.

Another embodiment of a document processing system with a generalized programming interface for an application program is provided in another aspect of the invention. The system is comprised of: a first document processor having a first set of capabilities that are accessible via a first set of command codes; a data processing system having an input/output port and including an object interface having properties, methods, and events for the first document processor, and having properties, methods, and events for a second document processor having a second set of capabilities; and a track driver coupled to the first document processor via the input/output port and to the object interface, configured and arranged to interface with the first document processor and provide selected ones of the first set of command codes to the first document processor in response to methods initiated via the object interface, and in response to status codes returned from the first document processor, report events to an application program via the object interface.

A method for operating a document processing system is yet another aspect of the invention. The method is comprised of the steps of: setting in an object interface values of properties that are associated with the document processing system, the object interface additionally having properties of another different document processing system; invoking methods for controlling operations of the document processing system, wherein the methods are defined in the object interface, and the object interface additionally includes methods for controlling different operations of the different document processing system; and processing events generated by the document processing system and reported via the object interface, the object interface additionally having event definitions for the different document processing system.

In another aspect of the invention, a method is provided for establishing a programming environment for a plurality of document processing systems, each document processing system having a document processor with different capabilities that are accessible via a different set of command codes. The method is comprised of the steps of: defining an object interface having properties, methods, and events that are descriptive of the document processors; establishing a plurality of respective instances of the object interface for the plurality of document processing systems, the instances of the object interface having a common programming interface for implementing application programs; coupling a plurality of respective track drivers to the instances of the object interface, each track driver responsive to methods initiated from the respective instance of the object interface, and configured and arranged to provide predetermined command codes to the document processor and report events back to the object interface.

The above Summary of the Invention is not intended to describe each disclosed embodiment of the present invention. This is the purpose of the figures and of the Detailed Description that follows.

BRIEF DESCRIPTION OF THE DRAWINGS

Other aspects and advantages of the present invention will become apparent upon reading the following detailed description and upon reference to the drawings in which:

FIG. 9 is a state table that indicates valid methods that may be invoked for particular states of an application program for a document processing system; and FIG. 10 is a state table of possible events to which an application program must be programmed to respond.

Figure 1:
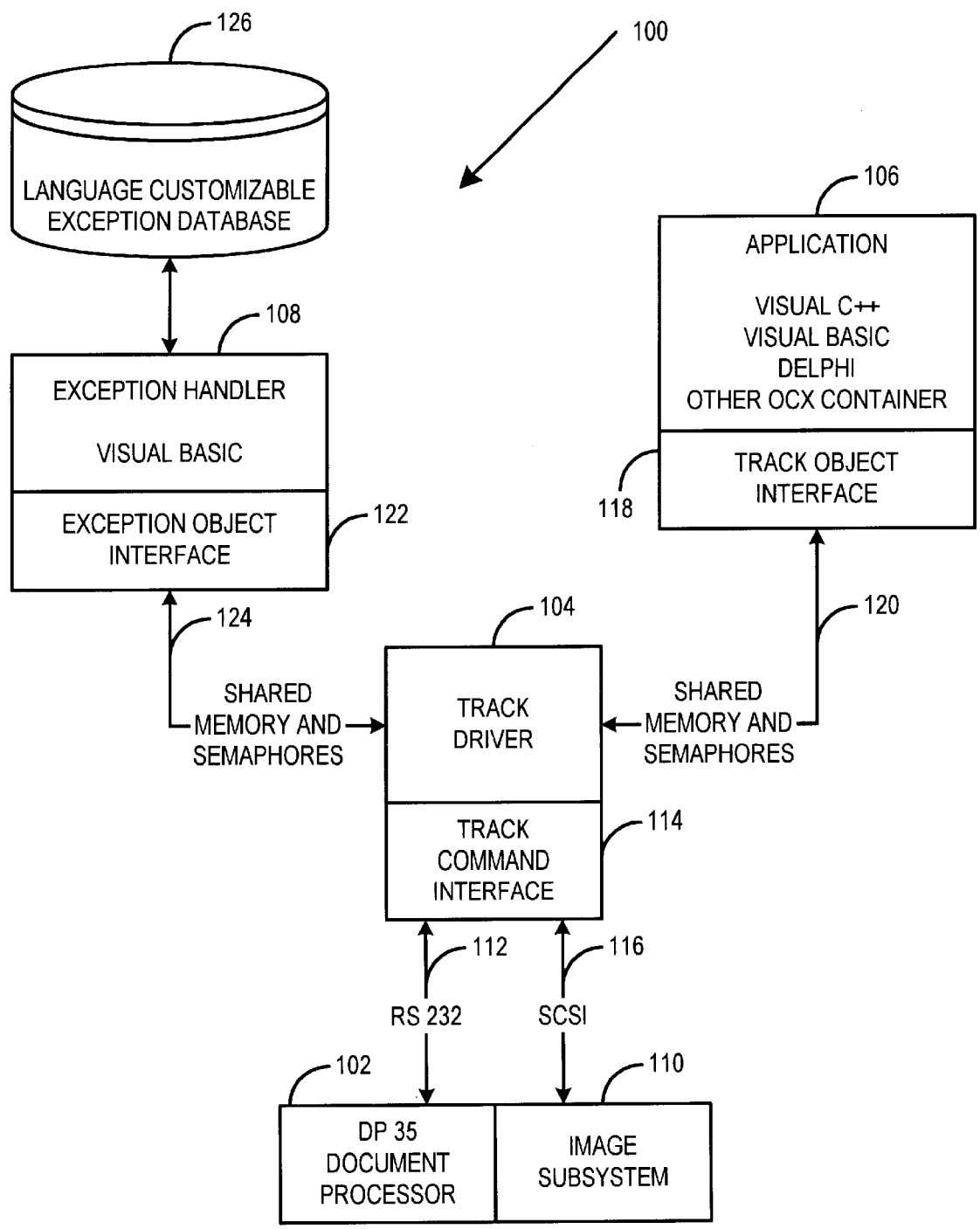
FIG. 1 is a block diagram of an example document processing system according to one embodiment of the present invention.

While the invention is amenable to various modifications and alternative forms, specifics thereof are shown by way of example in the drawings and the written description. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of document processing systems and arrangements. The invention has been found to be particularly advantageous in various types of document processing systems having different document processors. An appreciation of various aspects of the invention is best gained through a discussion of various application examples operating in such environments.

FIG. 1 is a block diagram of a first example document processing system according to an embodiment of the present invention. Major components of system 100 include document processor 102, track driver 104, application program 106, and exception handler 108. An example document processor 102 is the DP 35 document processor from Unisys Corporation. An image subsystem 110 is coupled to document processor 102, wherein image subsystem 100 captures and stores digital images of documents moved by document processor 102. Document processor 102 is coupled to track driver 104 via RS232 channel 112 and track command interface 114. Track driver 104 sends commands to document processor 102 via channel 112 and track command interface 114 and receives status codes back from document processor 102 via channel 112 and interface 114. Image subsystem 110 is coupled to track driver 104 via SCSI channel 116 and interface 114. Digital images of documents captured by image subsystem 110 are provided to track driver 104 via SCSI channel 116.

Various capabilities supported by different document processors include MICR and OCR reading, encoding, endorsing, image capturing, microfilming, and courtesy amount reading. Different document processors are also capable of processing documents at different speeds.

Track driver 104 is specifically tailored to interface with document processor 102. Specifically, other types of document processing systems, for example, DP 500 and DP 1800 systems, have track driver elements that are different from track driver 104. Track driver 104 generates document processor-specific commands and sends them to document processor 102 via channel 112. Such commands are generated in response to methods of track object interface 118 that are initiated by application program 106. Track driver 104 also reports status information received from document processor 102 to application program 106 via properties of track object interface 118. Track driver 104 is coupled to track object interface 118 via shared memory and semaphore structures as indicated by line 120.

Track driver 104 handles requests made via object interface 118 from application program 106 and issues commands to control document processor 102. Track driver 104 runs in the background. Driver 104 responds to asynchronous events from document processor 102 and reports the events to application program 106 via object interface 118. For exception type events, driver 104 reports to exception handler 108 via exception object interface 122.

Exception handler 108 of system 100 reports error status codes received by track driver 104 to an operator. Exception handler 108 is coupled to track driver 104 via exception object interface 122 and shared memory and semaphore structures as indicated by line 124. Exception handler 108 reads customized error messages from database 126, wherein the messages of database 126 are associated with various error codes received by track driver 104. The complexity of application program 106 is reduced because exception handler 108 responds to error codes from document processor 102, thereby relieving application program 106 from having to respond to such error codes.

Exception handler 108 runs in the background and provides a pop-up display with an explanation for document processor 102 errors when they occur. Errors are indexed by number in exception database 126. Exception handler directs an operator as follows:

1. Presents a list of documents that are in error to the operator.
2. Directs the operator to reprocess documents with the original application commands.
3. Compares code lines on repass to detect operator error.
4. Directs the operator to the pocket for pocketing completed items by hand.
5. Provides the option to delete the document.

Exception object interface 122 provides communication between exception handler 108 and track driver 104 and is implemented using Microsoft's object centered exchange.

Exception database 126 is an Access 2.0-format database containing all information that is viewable via exception handler 108. The information therein includes button labels, error messages, etc. The database contains an empty field next to an English language field for storing nationalized text. The information contained in the exception database pertains to diagnostic information from document processor 102. The text in the database includes step-by-step instructions to guide an operator in correcting a problem with document processor 102.

Track object interface 118 is the interface between application 106 and track driver 104. Track object interface 118 provides a simplified interface between application program 106 and document processor 102, provides application events that are consistent with Windows event-driven programming, translates properties into message packets, and checks property boundaries. The object interface provides control of document processor 102 based on values of properties set by application program 106, and notifies application program 106 of document processor 102 events through the event reporting mechanism.

In an example embodiment, track object interface 118 is implemented in an object centered exchange (OCX) that is available with Windows NT from Microsoft Corporation. OCX supports a variety of programming languages for developing application program 106. For example, such languages include Visual C++, Visual Basic, Delphi, and Visual FoxPro. Track object interface 118 is defined for use on a variety of document processing systems. For example, the same track object interface 118 is deployed on DP 35 systems, DP 500 systems, and DP 1800 systems. Properties, methods, and events are constructs that are available with OCX, and track object interface 118 is defined in terms of these constructs. A property describes a characteristic feature of a document processing system 100, a method describes a control sequence that can be initiated for a document processing system 100, and an event indicates status information reported back from a document processor 102. Properties, methods, and events are used by both track driver 104 and application program 106 to control the operation of document processing system 100. By providing a track driver 104 that is tailored to the specific operational requirements for document processor 102 and providing a track object interface 118 that is common to multiple platforms, a single programming interface may be used to develop applications for multiple platforms. The single interface allows programmers to easily program on multiple platforms, and may also provide for portability of code segments.

An example application program 106 controls all system 100 functions for conventional and image document processing, which includes feeding documents, reading code lines, endorsing, microfilming, encoding, and storing images. Such functions are accomplished by setting values associated with properties in object interface 118 and initiating control methods defined in object interface 118. Object interface 118 notifies application program 106 of events reported by track driver 104.

Figure 2:
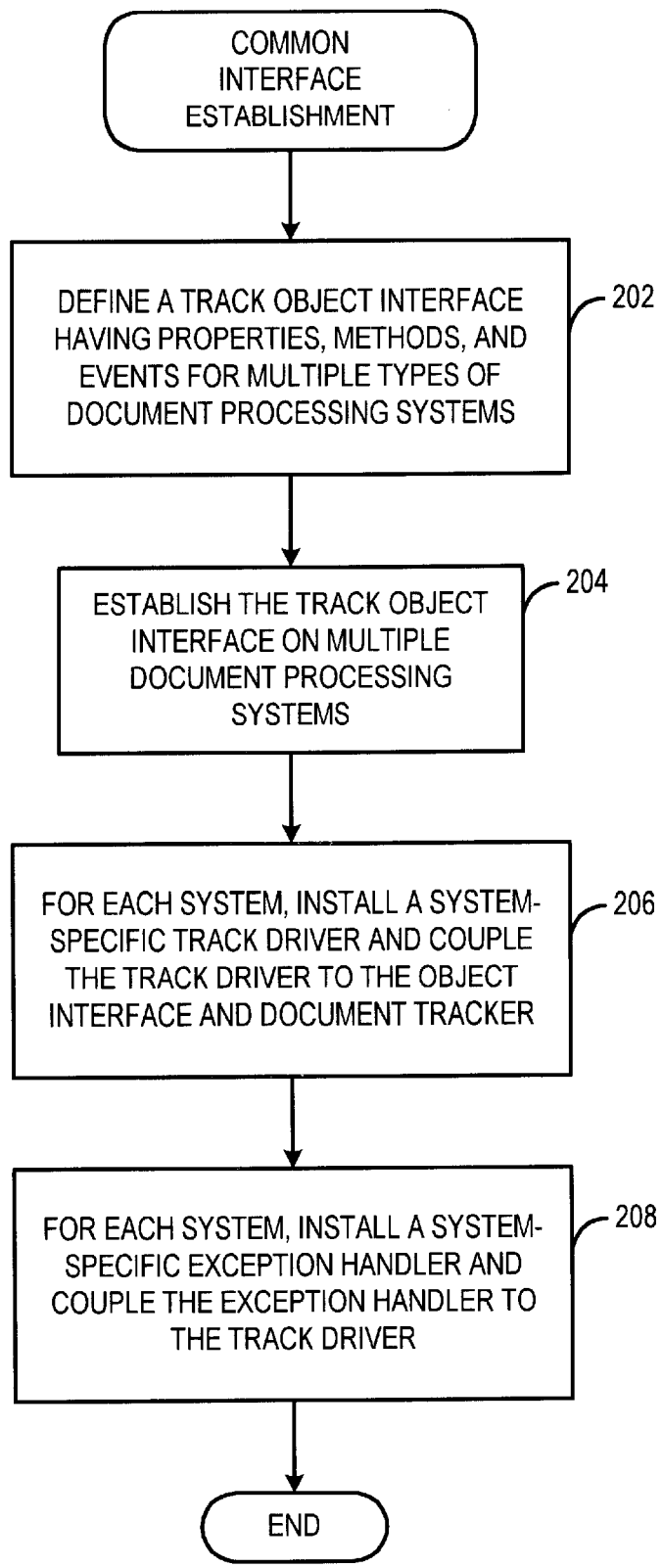
FIG. 2 is a flow chart of an example method for establishing a common application programming interface for multiple types of document processing systems.

FIG. 2 is a flow chart of an example method for establishing a common programming interface on multiple types of document processing systems. Examples of the different types of document processing systems include the DP 35, DP 500, and DP 1800 systems as described above. At block 202, an object interface is defined, where the object interface includes properties, methods, and events for the different types of document processing systems. An example definition of an object interface is set forth in the attached appendix. Continuing now at block 204, the track object interface is established on multiple types of document processing systems. As shown in the example system 100 of FIG. 1, track object interface 118 is installed on a computer system running Windows NT. For each of the different types of document processing systems, at block 206 a system-specific track driver is established and coupled to the track object interface and to the system specific document processor. As shown in the example system of FIG. 1, track driver 104 is coupled to track object interface 118 and to document processor 102. At block 208, a system-specific exception handler is established and coupled to the system specific track driver. For example, exception handler 108 is coupled to track driver 104 of system 100, as shown by exception object interface 122 and shared memory line 124. Once instances of the track object interface, track drivers, and exception handlers have been established on the document processing systems, application programs may be developed using the application programming interface to the track object interface. For example, application program 106 of FIG. 1 may be developed to interface with track object interface 118.

Figure 3:
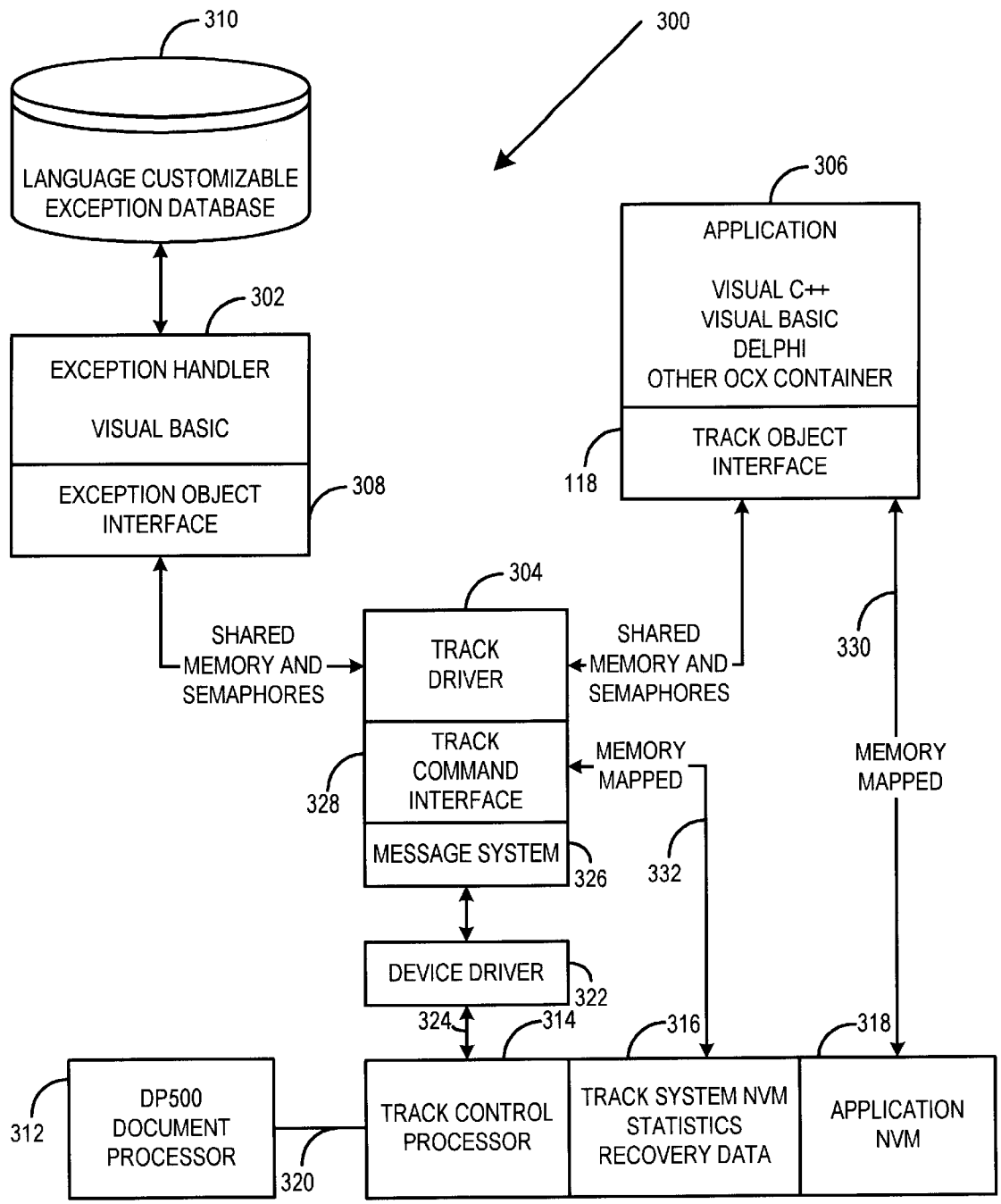
FIG. 3 is a block diagram of a second example document processing system according to an embodiment of the present invention.

FIG. 3 is a block diagram of a second example document processing system according to an embodiment of the present invention. System 300 is similar to system 100 of FIG. 1 in that it includes an exception handler 302 coupled to a track driver 304 and an application program 306 that is also coupled to track driver 304. Note that in accordance with the present invention, track object interface 118 for system 300 is another instance of track object interface 118 for system 100. Therefore, even though application program 306 may differ in functionality from application program 106 of system 100, document processor 312 may possess different capabilities, and the interface to document processor 312 is different from the interface to document processor 102, application program 306 and application program 106 may use the same programming interface to control the operations of systems 300 and 100, respectively. As indicated above for document processing system 100, in system 300 exception object interface 308, exception handler 302, and message database 310 are tailored to the specific requirements for system 300. Similarly, track driver 304 is specifically tailored to interact with document processor 312, wherein document processor 312 is an example DP 500 document processor.

In example system 300, exception handler 302, track driver 304, and application program 306 are software components that execute on a computer system running the Windows NT operating system. A system board is comprised of track control processor 314, track system non-volatile memory 316, and application non-volatile memory 318. Track control processor 314 of the system board is coupled to document processor 312 via cable 320 and coupled to device driver 322 via I/O bus 324. Device driver 322 interfaces with track control processor 314 via an I/O port. Message system 326 defines a protocol for interfacing between device driver 322 and track command interface 328.

Application NVM 318 is available for storage of data by application program 306, as illustrated by line 330. Note that the physical coupling of application program 306 to application NVM 318 is via bus 324. Track system NVM 316 is similarly available for storage of statistics and recovery data by track command interface 328 as illustrated by line 332.

Figure 4:
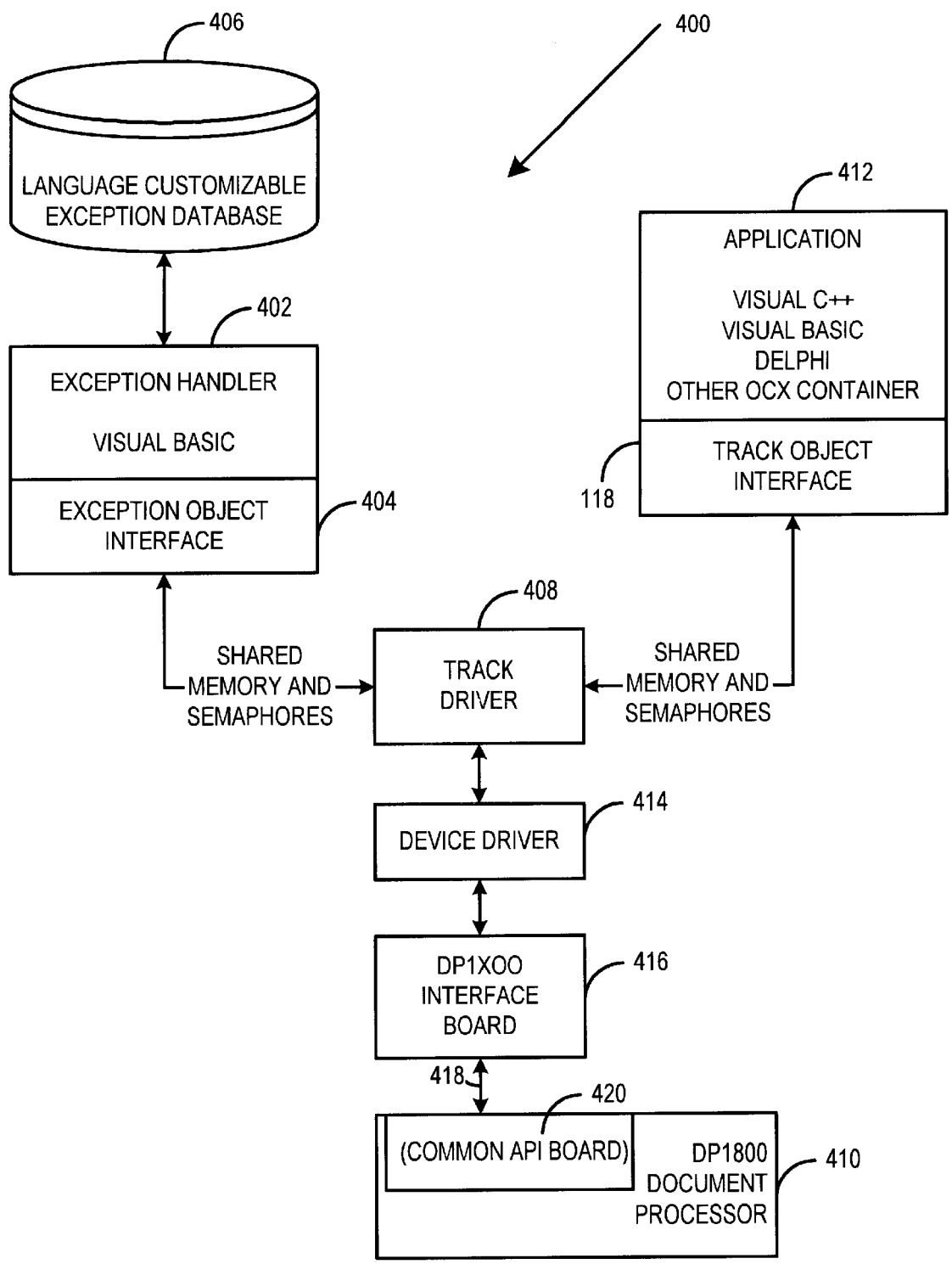
FIG. 4 is a block diagram of a third example document processing system according to an embodiment of the present invention.

FIG. 4 is a block diagram of a third example document processing system according to an embodiment of the present invention. As with systems 100 and 300, system 400 includes an exception handler 402, an exception object interface 404, a message database 406, and a track driver 408, all of which are tailored to the specific requirements for system 400. Example system 400 also includes a DP 1800 document processor 410. Track object interface 118 is yet another instance of the track object interface as described along with systems 100 and 300. Application program 412 controls overall operation of system 400. Exception handler 402, track driver 408, application program 412, and device driver 414 are software components that execute on a computer system operating Windows NT.

Device driver 414 is a conventional device driver that provides the interface between track driver 408 and interface board 416. Interface board 416 is coupled to device driver 414 via a conventional computer system input/output bus. Cable 418 couples interface board 416 to common API board 420 of DP 1800 document processor 410.

The attached appendix includes an example application program along with an example specification for track object interface 118. The specification of the database includes properties, methods, and events that are common to the different types of document processing systems 100, 300, and 400, and specifications of properties, methods, and events that are unique to the different types of document processing systems. Those skilled in the art will recognize that there are multiple ways in which a database may be expressed and fall within the scope of the present invention.

Figure 5:
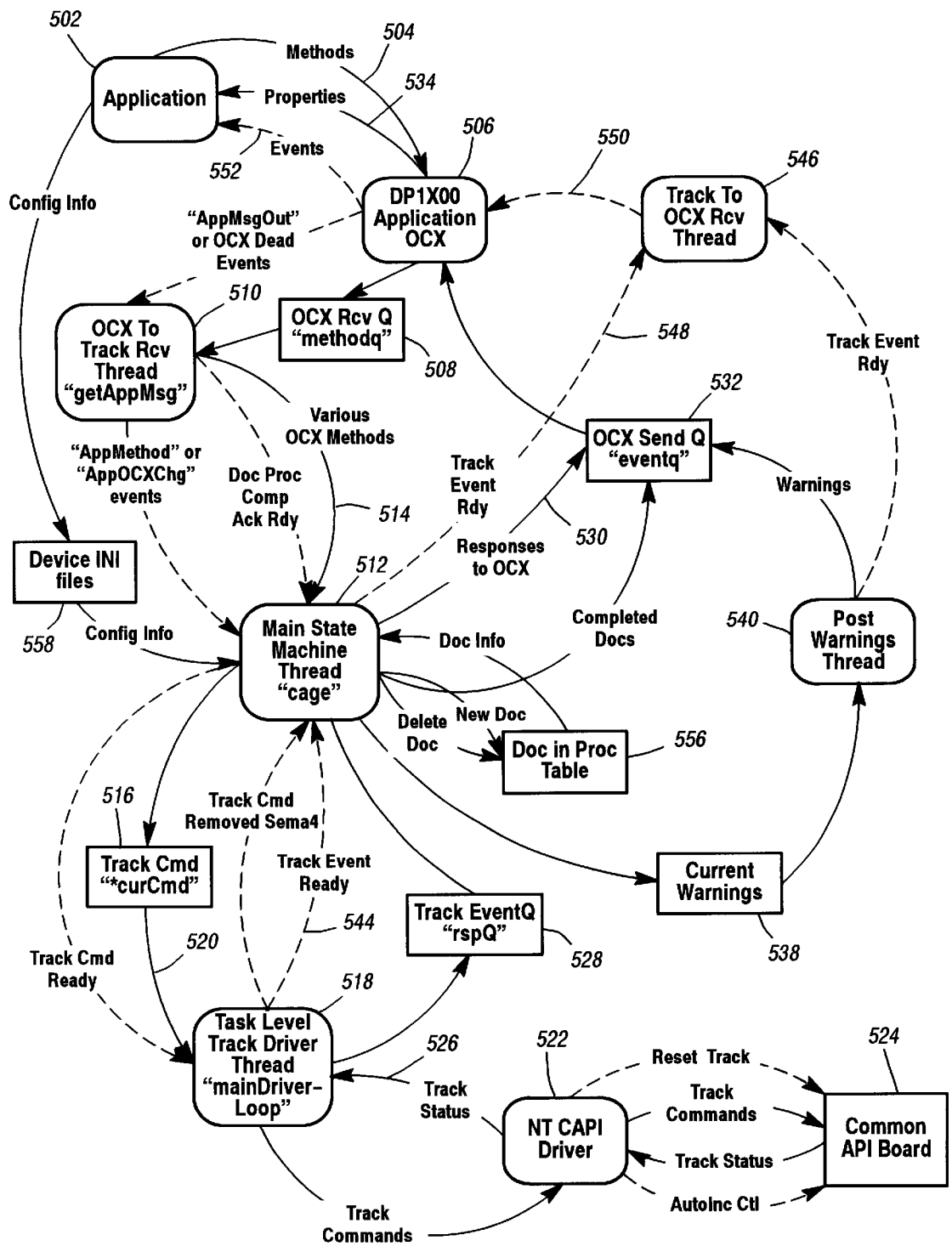
FIG. 5 is a task model diagram of the example document processing system of FIG. 4 when running an example application program.

FIG. 5 is a task model diagram for example document processing system 400. In the example task model of FIG. 5, application block 502 corresponds to application program 412 of FIG. 4. Most other blocks in the task model diagram represent various control threads of track driver 408. Generally, dotted lines represent event-driven transitions from one task to another, and solid lines represent commands to and responses from the various tasks.

Beginning now at task block 502, an application program initiates a method, as indicated by line 504. Task block 506, which is performed as specified by track object interface 118, inserts the method from application block 502 in method queue block 508. Task block 510 monitors queue 508 for methods to perform. Task block 510 sends a command to task block 512, as indicated by line 514, wherein the command is determined according to the method read from method queue 508. An example method is FlowStart. The main state machine of task block 512 inserts the command into a command queue as represented by block 516. A task level track driver of task block 518 reads commands from block 516, as indicated by line 520, and forwards a specific track command to the device driver of task block 522. The device driver of task block 522 then issues a track command to interface board block 524.

Task block 518 receives status codes from task block 522, as indicated by line 526, and inserts responses from a document processor into the response queue of block 528. The main state machine of block 512 reads responses from block 528 and inserts the responses in an event queue as indicated by line 530 and block 532. An example response results in updating the value of a property in either the track object interface 118 at task block 506 and reporting the property back to application block 502, as indicated by line 534. Other types of status codes returned from the document processor, for example warning codes, are returned to application block 502 via warnings block 538 and task block 540.

Events that are reported back to application block 502 are generally initiated at track driver block 518 in response to various status codes returned from the document processor. For example, track driver block 518 returns a ReadyToProcess event to state machine 512, as indicated by dotted line 544. State machine block 512 reports the event to receiver thread block 546 via line 548. Block 506 receives events from receiver thread block 546 via line 550, and such events are reported back to application block 502, as shown by line 552.

Those skilled in the art will recognize that the present invention supports additional functions for document processing. For example, the invention provides for tracking information related to documents in process as indicated by block 556, as well as for loading various configuration information as indicated by block 558.

Figure 6:
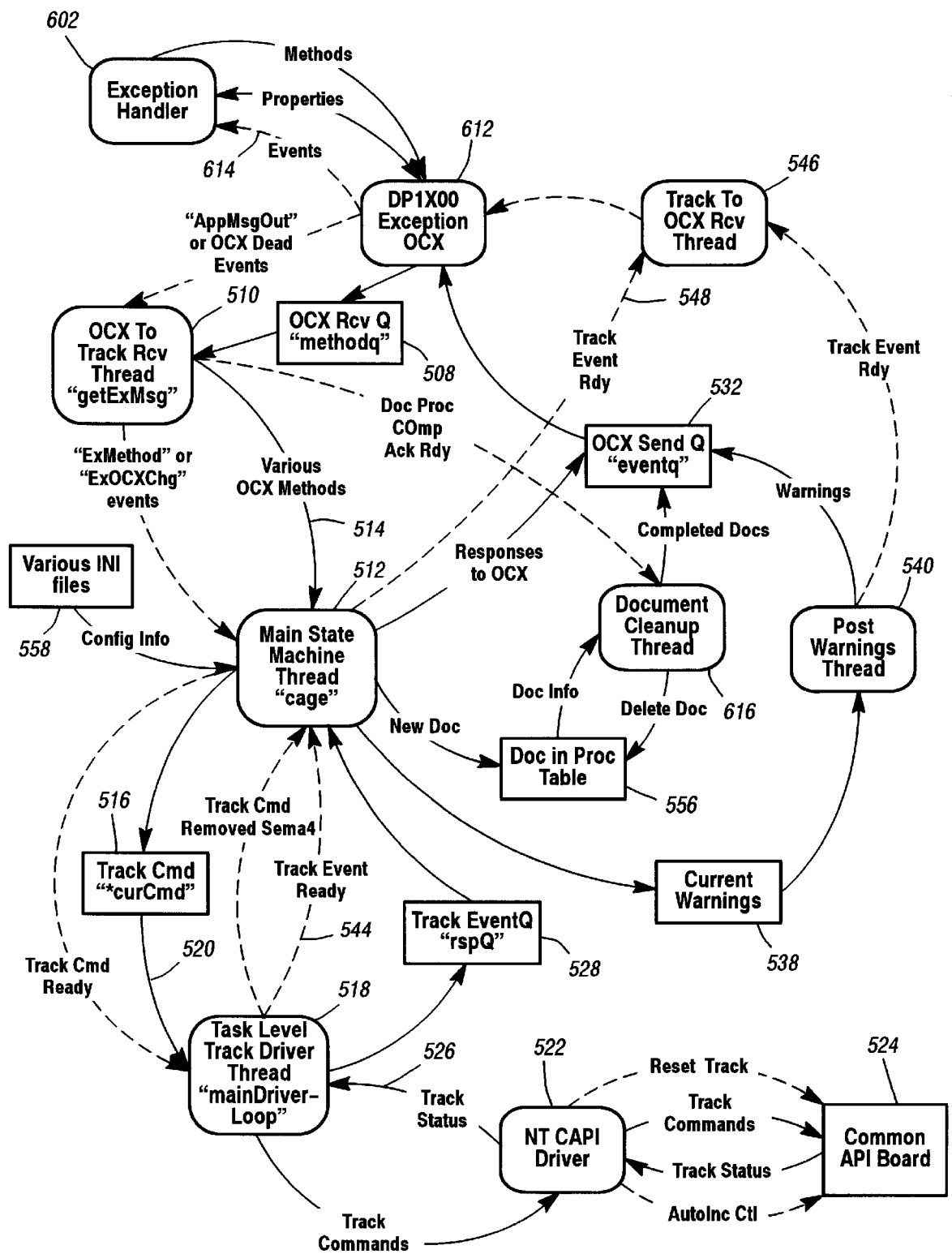
FIG. 6 is a task model diagram of the document processing system of FIG. 4 when responding to exception conditions.

FIG. 6 is an example task model diagram for processing exceptions generated from certain status codes returned from a document processor. The task structure for exception handling is similar to the task structure of FIG. 5, and, therefore, the corresponding discussion will not be repeated. Exception handler block 602 remains idle until an exception event occurs. Task block 546 for the receiver thread monitors the events reported by task block 512. Events such as document jams or mis-sorts are events that cause task block 546 to report the event to task block 612. The event is then reported back to exception handler 602 via line 614.

In an example exception handler function, task block 616 for a document clean-up thread is activated by a method initiated from exception handler 602. Task block 616 reads documents from table 556 and instructs the document processor to reprocess the document as specified by the commands in table 556. When reprocessing documents, if a document is out of sequence, a nested exception occurs, and the operator may elect to rerun the document or pocket the document for later processing.

Figure 7A:
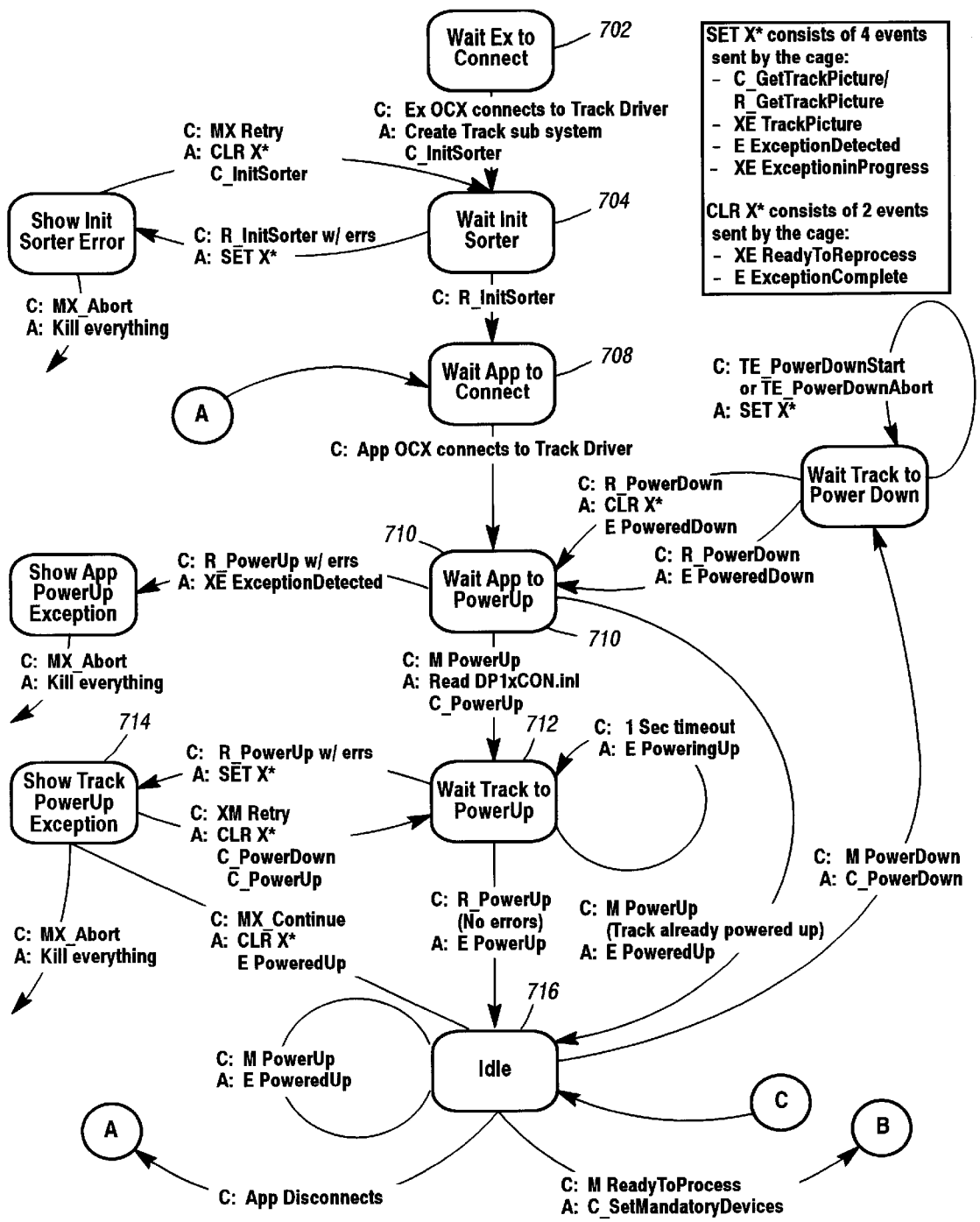
FIGS. 7A, 7B, and 7C comprise a state diagram of a generalized track driver for an example document processing system.
Figure 7B:
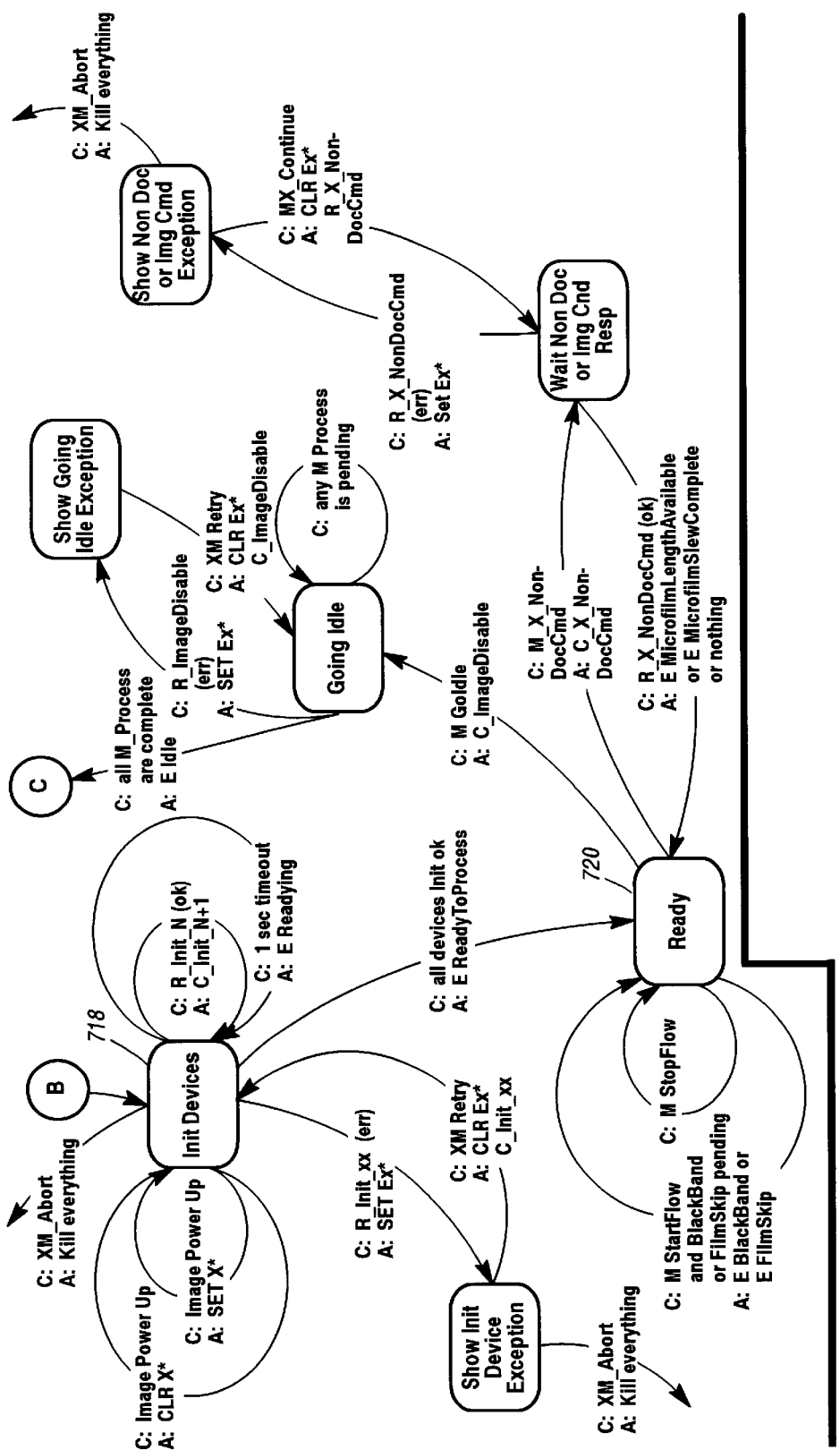
Figure 7B:
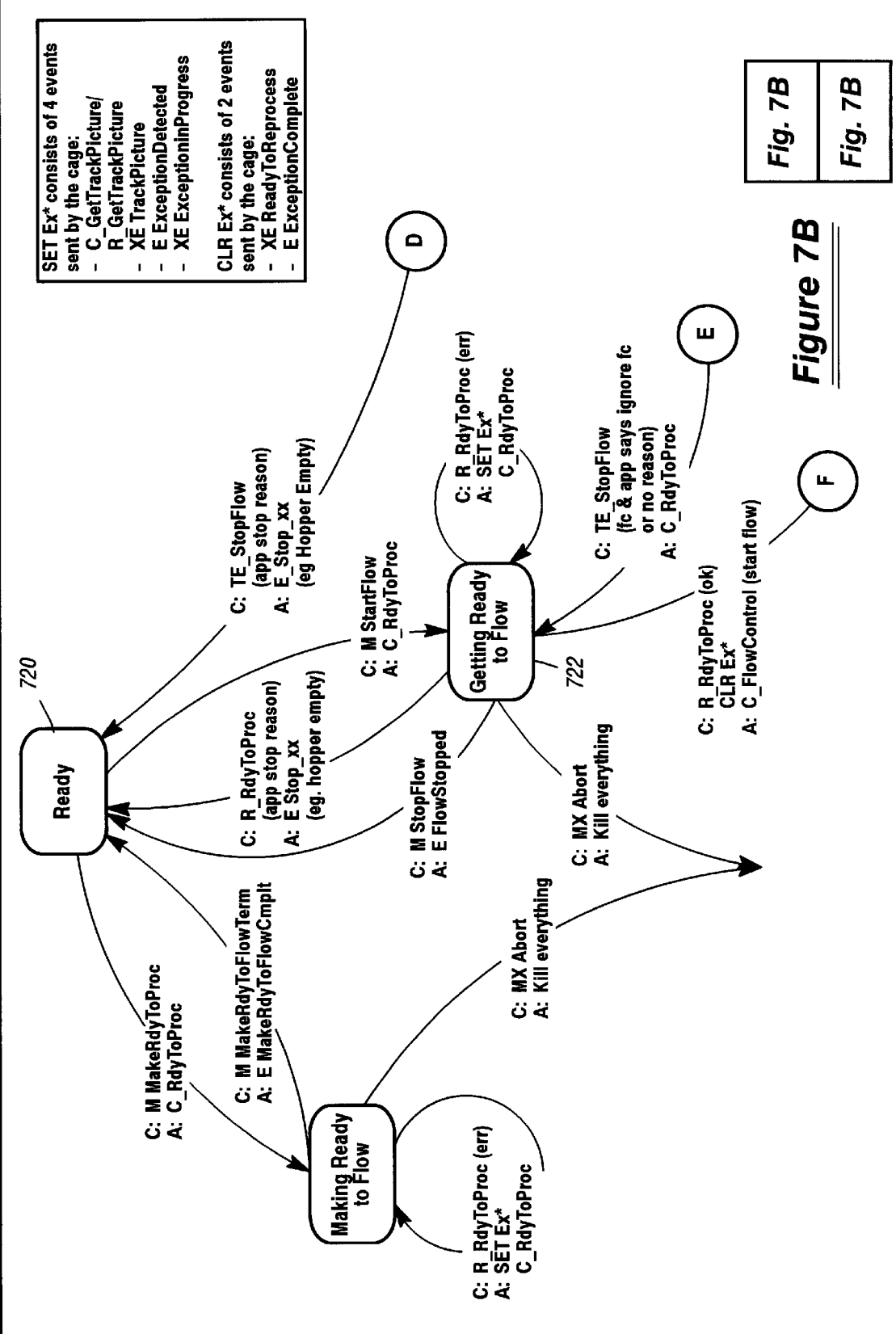
Figure 7C:
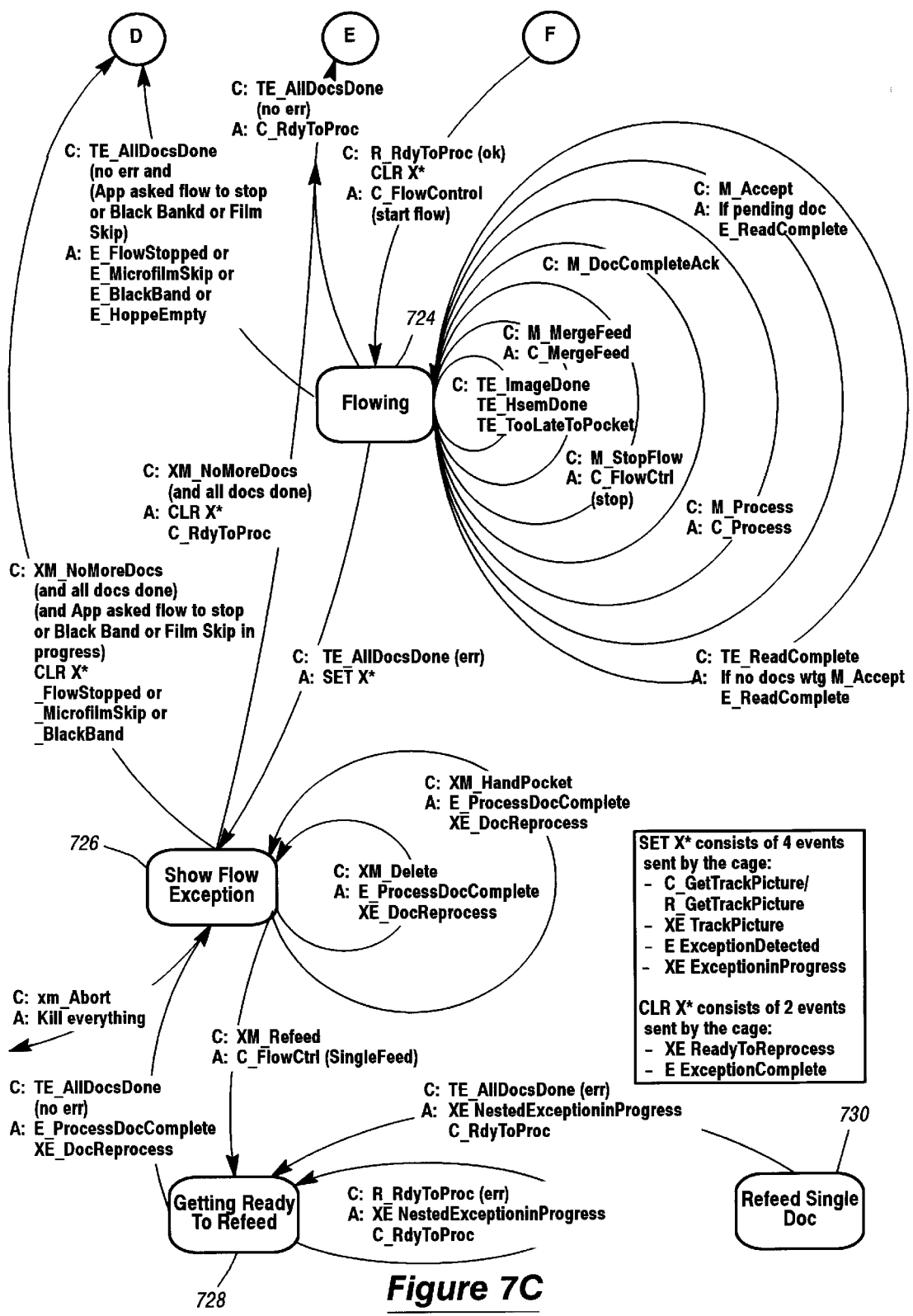

FIGS. 7A, 7B, and 7C comprise a state diagram for an example track driver 408. In state transitions, note that "C:" represents a command being issued, and "A:" represents the action taken based upon that command. At state 702, track driver 408 waits for an exception handler 402 to connect to track driver 408. At state 704, track driver 408 waits for a sorter of document processor 410 to initialize. Track driver 408 then waits for an application program 412 to connect, as shown at state 708. Once an application connects to track driver 408, track driver 408 transitions to state 710 to wait for the application program to initiate a PowerUp method. In response to initiation of a PowerUp method from application program 412, appropriate commands are issued to document processor 410, and at state 712, track driver 408 waits for document processor 410 to power-up. State 712 transitions to state 714 if document processor 410 responds with any one of various error codes. Once document processor 410 is in an acceptable powered up state, both states 712 and 714 transition to state 716. At state 716, track driver 408 remains idle until application program 412 disconnects, initiates a GoReadyToProcess method, or initiates a PowerDown method.

Track driver 408 transitions from idle state 716 to state 718 in response to initiation of a GoReadyToProcess method. At state 718, track driver 408 initializes various devices associated with document processor 410 and transitions to ready state 720 when all devices have been initialized.

One method that causes track driver 408 to transition from ready state 720 is a FlowStart method. In response to the FlowStart method from an application program 412, track driver 408 transitions to state 722 to get ready to process a flow of documents. In a general scenario, track driver 408 transitions to state 724 of state 7C when document processor 410 is ready to process and processes documents. While documents are flowing through document processor 410, track driver 408 remains in state 724. Under normal conditions, when document processor 410 has completed processing all documents, an event is issued to track driver 408, and track driver 408 transitions from flowing state 724 back to state 722 to get ready to flow documents. Various other events such as a BlackBand document event or a HopperEmpty event cause track driver 408 to transition from state 724 back to ready state 720.

Track driver 408 transitions from flowing state 724 to exception state 726 upon encountering an error condition, and track driver 408 transitions from state 726 to state 728 in response to a method to refeed a document of exception object interface 404. State 730 refeeds single documents and transitions to state 728 when all documents have been refed, and state 728 transitions to state 726 when all documents have been refed. When the exception condition has been successfully processed, state 726 transitions back to ready state 720 of FIG. 7B.

Figure 8:
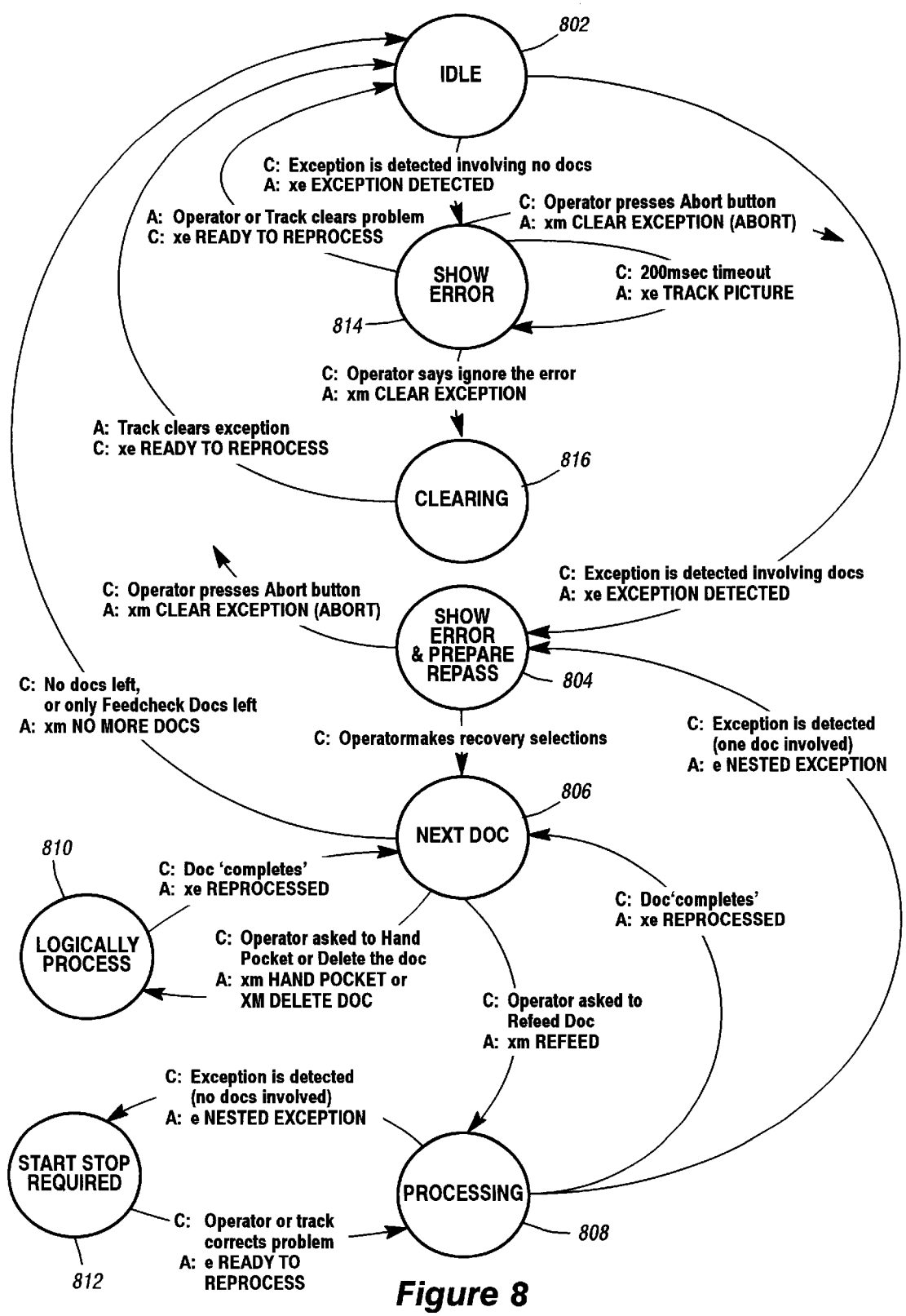
FIG. 8 is a state diagram for an example exception handler for a document processing system according to an embodiment of the present invention.

Continuing now with FIG. 8, a state diagram is shown of an example exception handler 302 in accordance with the present invention. At state 802, exception handler 402 remains in an idle state until an exception event is detected. When an event exception that involves documents occurs, exception handler 402 transitions to state 804. At state 804, exception handler 402 displays an error message for the operator and prepares to repass the documents. If the operator presses an abort button, exception handler 402 transitions back to idle state 802. However, if the operator makes recovery selections, exception handler 402 transitions to state 806.

In state 806, the operator can make various selections for processing the documents. If the operator asks to refeed the document, exception handler 402 transitions to state 808. If the document is refed and processed normally, exception handler 402 transitions from state 808 back to next document state 806. If the operator asks to hand pocket or delete the document, exception handler 402 transitions from next document state 806 to state 810. When processing of the document is complete, exception handler 402 transitions from state 810 back to next document state 806. If in processing state 808, exception handler 402 detects another exception event, exception handler 402 transitions from state 808 to nested error state 812.

Returning now to idle state 802, if exception handler 402 detects an exception event that does not involve documents, exception handler 402 transitions to state 814. At state 814, exception handler 402 displays an error message to the operator and waits for operator action. If the problem is cleared, exception handler 402 transitions back to idle state 802. If the operator indicates that the error should be ignored, exception handler 402 transitions to state 816 where the error condition is cleared, and exception handler 402 then transitions back to idle state 802.

FIG. 9 is a state table that shows methods that are valid to initiate for different states of an application program in an example embodiment of the invention. An "x" in an entry in the table indicates that when an application program is in the indicated state, it is valid to initiate the corresponding method. An "o" in an entry in the table indicates that for document processing systems such as the example DP 500, when an application program is in the indicated state, it is valid to initiate the corresponding method.

FIG. 10 is a state table that shows events to which an application program must respond. An "x" in an entry in the table indicates that when an application program is in the state indicated by the "x", the corresponding event may occur, and the application program must be programmed to respond to the event. Note that as indicated by the legend, various events in the table are associated with DP 500 and DP 1xxx example systems only.

The above specification, examples and data provide a complete description of the manufacture and use of the composition of the invention. Those skilled in the art will recognize that the arrangements described above are operable on various categories of computer systems and data processing arrangements, and that the described methods operable in such arrangements may be embodied in software, firmware, microcode, A6, PGAs, as well as other forms. Software implementations may be distributed in various forms of computer readable media known in the art. Since many embodiments of the invention can be made without departing from the spirit and scope of the invention, the invention resides in the claims hereinafter appended.

APPENDIX

The following is an example of a Visual Basic application program. The Visual Basic example program has the following features:
- Paper handling--set for auto feed from the primary hopper; merge feed if the Merge button is selected.
- Readers--set for MICR read only with display each code line during document flow.
- State integrity--the application state is displayed. The DPOCX control is large enough to display OCX control state.
- Document integrity--the application-assigned IM for each document is displayed as they are completed, as well as the document status.
- Warnings--set for warnings that are occur during processing are displayed.
- Control buttons-set for enabled/disabled, based on application state.

```
Private Sub CmdExit-Clicko
    Unload Me
End Sub

Private Sub CmdGoidle_Click()
        CmdGoidle.Enabled = False
        CmdStartFlow.Enabled = False
        cmdMergeFeed.Enabled = False
        RunStateMachine (e_goidle)
End Sub Private Sub cmdGoReady_Click()
        cmdGoReady.Enabled = False
        cmdPowerOff.Enabled = False
        CmdExit.Enabled = False
        RunStateMachine (E_readytostart)
End Sub Private Sub cmdMergeFeed_Click()
    If RunState = s_entering Then
            frmDP50O.Dpocx1.MergeFeed 1 'mergefeed
        Else
            frmDP50O.Dpocx1.FlowStart 4 'singlemerge
            RunState = s_entering
        End If
End Sub Private Sub cmdPowerOff_Click()
        cmdGoReady.Enabled = False
```

```
             cmdPowerOff.Enabled = False
             CmdExit.Enabled = False
             RunStateMachine (e_poweroffbutton)
         End Sub
         Private Sub cmdPowerOn_Click()
             cmdPowerOn.Enabled = False
             CmdExit.Enabled = False
             RunStateMachine (e_poweron)
         End Sub Private Sub cmdResumeFlovv_Click()
             frmDP50O.cmdResumeFlow.Enabled = False
             frmDP50O.Dpocx1.ResumeFeeding
         End Sub Private Sub CmdStartFlow_Click()
             CmdStopFlow.Enabled = True
             cmdMergeFeed.Enabled = True
             CmdStartFlow-Enabled = False
             CmdGoidle.Enabled = False
             RunStateMachine (e_startbutton)
         End Sub
         Private Sub CmdStopFlow-Clicko
             cmdMergeFeed.Enabled = False
             CmdStopFlow.Enabled = False
             cmdResumeFlow.Enabled = False
             CmdStartFlow.Enabled = True
             RunStateMachine (e_stopflow)
         End Sub Private Sub Dpocx1_BlackBandEvent()
         RunStateMachine (e_blackband)
         End Sub Private Sub Dpocx1_DocComplete()
             lblDINNumber-Caption = Dpocx1.cAppDocDIN
             Select Case Dpocx1.cDocCompleteStatus
                 Case 0
                     lblDocStatus.Caption = "Good"
                 Case 1
                     lblDocStatus.Capton = "Reprocessed"
                 Case 3 'bits 0 and 1 set
                     lblDocStatus.Capton = "Reprocessed and Hand Pocketed"
                 Case 5 'bits 0 and 2 set
```

```
                        lblDocStatus.Caption ="Reprocessed and Deleted"
            End Select
        End Sub Private Sub Dpocx1_DocReadComplete()
            Codeline = Dpocx1.rRdr1CodeLine
            lblReaderLine.Capton = Codeline
            RunStateMachine (e_docreadcomplete)
        End Sub Private Sub Dpocx1_ExceptionComplete()
            cmdResumeFlow.Enabled = Dpocx1.ecManualDropSwitch
        End Sub Private Sub Dpocx1-FlowStopped()
            RunStateMachine (e_flowstopped)
        End Sub Private Sub Dpocx1-HopperEmpty()
            RunStateMachine (e_hopperempty)
        End Sub Private Sub Dpocx1-Idle()
            RunStateMachine (e_idle)
        End Sub Private Sub Dpocx1-MachineDead()
            lblAPPState.Caption = "DP500 not usable ... exit application"
        End Sub Private Sub Dpocx1_PoweredDown()
            RunStateMachine (e_deactivated)
        End Sub Private Sub Dpocx1-PoweredUp()
            RunStateMachine (e_activated)
        End Sub Private Sub Dpocx1_PoweringUp()
            RunStateMachine (e_activating)
        End Sub Private Sub Dpocx1_Readying()
            RunStateMachine (e_readying)
        End Sub
```

35

```
        Private Sub Dpocx1_ReadyToProcess()
              RunStateMachine (e_readytoprocess)
        End Sub
       Private Sub Dpocx1_Warning()
              lblWarning.Caption = Dpocx1.wAlertEnglishText
        End Sub Private Sub Form_Load()
              Width = 800 * Screen.TwipsPerPixelX
              Height = 600 Screen.TwipsPerPixelY
              Screen.MousePointer = 1
              CenterForm Me
              cmdPowerOn.Enabled = False
              CmdExit.Enabled = False
              cmdGoReady.Enabled = False
              cmdPowerOff.Enabled = False
              CmdStopFlow.Enabled - False
              cmdResumeFlow.Enabled = False
              CmdGoidle.Enabled = False
              CmdStartFlow.Enabled = False
              cmdMergeFeed.Enabled = False
              RunState = s_poweroff
              lblAppState = "Powered Off"
              Call SetCommandButtons(RunState)
        End Sub
```

---

```
        Attribute VB_Name = "startup"
        Option Explicit

Global RunState As Integer
        'states
        Global Const_s-poweroff = 0
        Global Const s_powerup = 1
        Global Const  s_idle = 2
        Global Const s_getready = 3
        Global Const s_ready = 4
        Global Const s_goingidle = 5
        Global Const s_entering = 6
        Global Const s_powerdown = 7
        'events
```

```
        Global Const e_poweron = 0
        Global Const e_activating = 1
        Global Const e_activated = 2
        Global Const e_deactivated = 3
        Global Const e_readytoprocess = 6
        Global Const e_idle = 7
        Global Const e_readying = 8
        Global Const e_backband = 9
        Global Const e_flowstopped = 10
10      Global Const e_hopperempty = 11
        Global Const e_docreadcomplete = 12
        Global Const e_readytostart = 13
        Global Const e_poweroffbufton = 14
        Global Const e_stopflow = 15
15      Global Const e_startbutton = 16
        Global Const e_goidle = 17
        Global Const e_exit = 18

Global basedrive As String
        Global readerini As String
        Global pocketini As String
        Global Codeline As String
        Global docDIN As Integer
        Global trkcount As Integer
        Sub ConfigureRun()

frmDP500.Dpocx1.iEntryIgnoreDogEarError = False
                frmDP500.Dpocx1.iEntryStopOnBlackBand = False
                frmDP500.Dpocx1.iRdrFontLoadPath = readerini
                frmDP500.Dpocx1.iStkSetLogicalPocketsPath = pocketini
                frmDP500.Dpocx1.iEndFontSetup = ""
                frmDP500.Dpocx1.iImgCarSetupFilePath = ""
                frmDP500.Dpocx1.iImgAnnotate = ""
                frmDP500.Dpocx1.iImgImageDirectory = ""
                frmDP500.Dpocx1.iEncPosition = 0
                frmDP500.Dpocx1.iHSEMOutSort = False
                frmDP500.Dpocx1.iMfilmLampIntensity = 3
                frmDP500.Dpocx1.iXcpHandlerStyle = 0
                frmDP500.Dpocx1.iXcpSecFdridentity = ""
                frmDP500.Dpocx1 iXcpSecFdrOptions = 0 docDIN = 1

        End Sub
```

```
Sub CenterForm(myform As Form)
        myform.Left = (Screen.Width - myform.Width)/2
        myform.Top = (Screen.Height - myform.Height)/2
End Sub Sub Main()
        readerini = CurDir +"\READER.INI"
        pocketini = CurDir + "\POCKET.INI"
        frmDP500.Show 0
End Sub Sub RunStateMachine(event As Integer)
        Select Case RunState Case s_poweroff
        Select Case event
                Case e_poweron 'operator button
                        trkCount = 0
                        RunState = s_powerup
                        frmDP500.Dpocx1.PowerUp
        End Select Case s_powerup
        Select Case event
                Case e_activating 'dp500 event
                        trkCount = trkCount + 1
                        frmDP500.lblAppState = "Powering Up" + Str(trkCount)
                Case e_activated 'dp500 event
                        trkCount = 0
                        frmDP500.lblAppState ="Idle"
                        RunState = s_idle
        End Select Case s_idle
        Select Case event
                Case e_readytostart 'operator button
                        Call ConfigureRun
                        RunState = s_getready
                        frmDP500.Dpocx1.GoReadyToProcess
                Case e_poweroffbutton 'operator button
                        frmDP500.lblAppState ="Powering Down"
                        RunState = s_powerdown
                        frmDP500.Dpocx1.PowerDown
        End Select Case s-goingidle
```

```
            Select Case event
                Case e_idle 'dp500 event
                    frmDP500.lblAppState = "Idle"
                    RunState = s_idle
            End Select Case s_powerdown
            Select Case event
                Case e_deactivated 'dp500 event
                    frmDP500.lblAppState = "Powered Off"
                    RunState = s_poweroff
            End Select Case s_getready
            Select Case event
                Case e_readying 'dp500 event
                    trkCount = trkCount + 1
                    frmDP500.lblAppState = "Initalizing Track" + Str(trkCount)
                Case e_readytoprocess 'dp500 event
                    trkCount = 0
                    RunState = s_ready
                    frmDP500.lblAppState = "Ready"
            End Select Case s_ready
            Select Case event
                Case e_startbutton 'operator button
                    frmDP500.lblAppState = "Entering"
                    RunState = s_entering
                    frmDP500.Dpocx1.FlowStart 0 'autofeed
                Case e_goidle 'operator button
                    frmDP500.lblAppState = "Going Idle"
                    RunState = s_goingidle
                    frmDP500.Dpocx1.Goidle
            End Select Case s_entering
            Select Case event
                Case e_stopflow 'operator button
                    frmDP500.Dpocx1.FlowStop
                Case e_flowstopped 'dp500 event
                    frmDP500.lblAppState = "Ready"
                    RunState = s_ready
                Case e_blackband 'dp500 event
                    frmDP500.lblAppState = "Ready"
                    RunState = s_ready
```

39

```
            Case e_hopperempty 'dp500 event
                frmDP500.lblAppState = "Ready"
                RunState = s_ready
            Case e_docreadcomplete 'dp500 event
                Call AcceptAndProcessDoc
            End Select End Select .change buttons as needed
        Call SetCommandButtons(RunState)

End Sub

Sub AcceptAndProcessDoc()

'accept doc
        frmDP500.Dpocx1.DocAccept frmDP500.Dpocx1.pAppDocData = Codeline
        frmDP500.Dpocx1.pAppDocDIN = docDIN
        docDIN = docDIN + 1

'Endorse options
        frmDP500.Dpocx1.pEndFrontOptons = 0
        frmDP500.Dpocx1.pEndRearOptons = 0
        frmDP500.Dpocx1.pEndFrontLine1 = ""
        frmDP500.Dpocx1.pEndFrontLine2 = ""
        frmDP500.Dpocx1.pEndFrontLine3 = ""
        frmDP500.Dpocx1.pEndFrontLine4 = ""
        frmDP500.Dpocx1.pEndRearLine1 = ""
        frmDP500.Dpocx1.pEndRearLine2 = ""
        frmDP500.Dpocx1.pEndRearLine3 = ""
        frmDP500.Dpocx1.pEndRearLine4 = ""
        frmDP500.Dpocx1.pEndFrontFontNumber = 0
        frmDP500.Dpocx1.pEndRearFontNumber = 0
        frmDP500.Dpocx1.pEndFrontLogoNumber = 0
        frmDP500.Dpocx1.pEndRearLogoNumber = 0
        frmDP500.Dpocx1.pEndFrontLogoPosition = 0
        frmDP500.Dpocx1.pEndRearLogoPosition = 0
        frmDP500.Dpocx1.pEndRearLogoNumber = 0
        frmDP500.Dpocx1.pEndRearLogoNumber = 0

'stamp
        frmDP500.Dpocx1.pStmpOptions = 0
        frmDP500.Dpocx1.pStmpFrontPosition = 0
```

```
                    frmDP500.Dpocx1.pStmpRearPositon = 0

'Encoder data
                    frmDP500.Dpocx1.pEncData = ""
                    frmDP500.Dpocx1.pEncOptons = 0

'Mfilmer
                    frmDP500.Dpocx1.pMfilmOptions = 0
                    frmDP500.Dpocx1.pMfilmVerticalAnnotation = ""
                    'Image
                    frmDP500.Dpocx1.pImgCarDocType = 0
                    frmDP500.Dpocx1.pImgOptions = 0
                    frmDP500.Dpocx1 pImgFilename = ""
                    'exception handling
                    frmDP500.Dpocx1.pXcpDeleteAllowed = False
                    frmDP500.Dpocx1.pXcpIdentify = ""
                    frmDP500.Dpocx1.pXcpOptions = 0
                    'Pocket
                    frmDP500.Dpocx1.pStkPocket = 1

'process the doc
                    frmDP500.Dpocx1.DocProcess

End Sub

Sub SetCommandButtons(state As Integer)
                    Select Case state
                    Case s_poweroff
                            frmDP500.cmdPowerOn.Enabled = True
                            frmDP500.CmdExit.Enabled = True
                    Case s_idle
                            frmDP500.cmdGoReady.Enabled = True
                            frmDP500.cmdPowerOff.Enabled = True
                            frmDP500.CmdExit.Enabled = True
                    Case s_ready
                            frmDP500.CmdGoidle.Enabled = True
                            frmDP500.CmdStartFlow.Enabled = True
                            frmDP500.cmdMergeFeed.Enabled = True
                            frmDP500.CmdStopFlow.Enabled = False
                    End Select
 45     End Sub
```

41

DP Track OCX Properties
The following notes apply to all properties:
- In general, if the hardware configuration does not support the value contained in a particular property, the fact is logged by the system software and the property setting is ignored. For more information, see the descriptions for the cDocCompleteStatus or iMandatoryDevices properties.
- Invalid property values for a device result in the device being disabled.
- Once an output property is set to a value, it retains that value until it is modified by the application. Input properties are updated just before an event is fired.

The following topics describe DP track OCX properties:
C* Properties-Document Completion
Cfg* Properties--Configuration
Ec* Properties--Exception Complete
Ep* Properties--Excepton in Progress
I* Properties--Initialization
P* Properties--Process Document
R* Properties--Reader
Rec* Properties--Recovery from Power Failure
Repass* Properties--Repass Documents
Start* Properties--Start Up
T* Properties--Track Nondocument Commands
wAlert* Properties--Warnings

**C* Properties--Document Completion**
C* properties are available after the DocComplete Event is fired. They are set by the document processor and read by the application. The c* properties identify which document is processed and initiate storage of the document record. DocComplete events are generated for documents in the order that the DocProcess methods were issued.
DP 250/500 only--These properties are also valid during power failure recovery to provide an application with required information for item level recovery. The following topics describe c* properties:
cAppDocData Property
cAppDocDataSAPropertu
cAppDocDIN Property
cDocCompleteStatus Property
cStkPocket Property cAppDocData Property
Type: User Defined
This property is valid only during the DocComplete Event. It contains the value of the pAppDocData Property when the DocProcess Method was invoked for this document. The maximum size is 231 bytes.
Related Properties, Events, and Methods
pAppDocData Property, DocProcess Method, DocComplete Event cAppDocDataSA Property
Type: Variant - must be a safe array of unsigned characters.
This property has the same purpose as the cAppDocData property except that this property can contain binary data with embedded NULLs (byte value of 0x00). The content of this structure is not known by the DPOCX or Track Control and is copied without examination. The SA suffix on this property represents "Safe Array". See the \notes\demo\vc40 for a demonstration of the safe array implementation.
Related Properties, Events, and Methods
cAppDocData Property, pAppDocData Property, pAppDocDataSA Property, DocProcess Method, DocComplete Event cAppDocDIN Properly
Type: Long
This property is valid only during the DocComplete Event. It contains the value of the pAppDocDIN Property when the DocProcess Method was invoked for the corresponding document.
Related Properties, Events, and Methods
pAppDocDIN Property, repassAppDocDIN Property, DocComplete Event, DocProcess Method cDocCompleteStatus Properly
Type: Long
This property is valid only during the DocComplete Event.
Valid Values
All bits have two values: 0 (off) and 1 (on). A returned value of 0 (all bits off) in cDocCompleteStatus indicates that the item was processed successfully. Any bit being set to 1 indicates that a device operation was not performed as requested. Below the table are the conditions under which bits can be set by Track Control. More than one bit can be set at one time. Not all bits comprising this property are used by all sorter types. Exceptions are noted where applicable in the following table.
*Note: Bit 0 is the least significant bit.*

| Bit | Description |
| --- | --- |
| 0 | Is set to 1 to indicate the document is involved in a transport exception condition and was successfully recovered. This can be used by balancing applications. |
| 1 | Is set to 1 if the document was hand pocketed by the operator during exception reprocessing. |
| 2 | is set if the document was deleted by the operator during exception reprocessing or if the document was a feed check item and stop on feed check is selected in the INI file. (Used on DP 1XXX only.) |
| 3 | Is set if the document was outsorted to the reject pocket by the HSEM device. (Not used on DP 30.) |

| | | |
|---|---|---|
| | 4 | Is set if the document is a feed check item that was sent to the reject pocket. No other bits are meaningful in a feed check, since all devices are turned off during a feed check. (Used on DP 1 XXX only.) |
| | 5 | Is set if the HSEM operation was incomplete. (Not used on DP 30.) |
| | 6 | Is set if the IMAGE operation was incomplete. |
| | 7 | Is set if the MICROFILMER operation was incomplete. (Not used on DP 30.) |
| | 8 | Is set if the FRONT ENDORSE (MJE) operation was incomplete. |
| | 9 | Is set if the REAR ENDORSE (MJE) operation was incomplete. |
| | 10 | Is set if the application-supplied POCKET NUMBER was invalid and the document was rejected. |
| | 11 | Is set if the FRONT STAMP operation was incomplete. |
| | 12 | Is set if the REAR STAMP operation was incomplete. |
| | 13 | Is set if the CAR operation was incomplete. (Not used on DP 30.) |
| | 14 | is set if the LOW SPEED ENCODE operation was incomplete. (Not used on DP 1XXX.) |

Conditions for Track Control to Set Bits

Bits 5-14 are intended to give the application feedback about incomplete device operations. Any of these bits would be set if some part of the application-supplied data for a device was invalid. This means that Track Control either modified the data or the device was not used for this document. An example of data modification would be an invalid endorse character supplied by the application. In this case the invalid character would be translated to a blank. An example of turning off a device for a document would be an invalid endorse font number. Conditions under which Track Control sets bits 5-14 differs among the various sorter platforms. Jump to the subsection for the sorter of your choice:

- DP 30
- DP 250/500
- DP 1XXX

DP 30

Bit 6 will be set under any of the following conditions:
- An image request was made when the image module is not fitted.
- The image option was switched off by the operator during exception processing.

Bits 8 and 9 will be set under any of the following conditions:
- Endorse data was sent, but the endorser is not fifted.
- Endorse data length is greater than the maximum and has been truncated.
- Endorse data has invalid characters which have been changed to blanks.
- Endorser margin setting is greater than the maximum.
- The endorse option was switched off by the operator during exception processing.

Bits 11 and 12 will be set under any of the following conditions:
- Stamp position is greater than the maximum.
- A stamp request was made when stamp is not fitted.

- The stamp option was switched off by the operator during exception processing.

DP 250/500

All devices provide positive feedback for operations requested by the application. Such devices include the low speed encoder, all endorsement, all stamps, HSEM, microfilm, image, CAR, and pocket modules. For example, if an operator hand pockets an item but device operations have not been completed for this item, the application is told via the cDocCompleteStatus property.

DP 1XXX
- The operator disabled a device via the console switch, and the device was being used for this document but was not mandatory.
- If asked to PEP, but the PEP endorsement data was truncated
- if asked to PEP, but the PEP endorser is not fitted
- If asked to stamp endorse, but the stamp unit is not fifted
- If asked to front stamp, but only a rear stamp is fitted (and used instead)
- If asked to rear stamp, but only a front stamp is fitted (and used instead)
- If asked to MJE, but the MJE endorser is not fitted
- If asked to MJE, but the operator has turned off power to the MJE unit
- If asked to use an invalid MJE font, resulting in the default, font 6 being used instead
- If asked to use an invalid MJE logo, resulting in no logo being printed
- If asked to MJE, but the MJE endorsement data was truncated
- If asked to microfilm, but the microfilmer is not fitted
- If asked to microfilm, but the operator has turned off power to the microfilmer
- If MFILMTRACKINGON=1 in the DP1XXX Reader Initialization file, but a document is received without a microfilmer vertical annotation, causing MFILMTRACKINGON to be turned off
- If asked to microfilm, but the microfilm vertcal annotation was truncated
- If asked to microfilm, but the document was hand pocketed or deleted during an exception (can only be detected if MFILMTRACKINGON=1)
- If asked to image, but image is not fifted
- If asked to capture a second front image, but only one camera is fifted
- If asked to image, but the operator has powered off the image unit
- If asked to image, but the Image AppDocData was truncated
- If asked to image, but the document was hand pocketed or deleted during an exception
- If asked to CAR, but CAR is not fitted
- If asked to HSEM, but HSEM is not fifted
- If asked to HSEM, but the encode data was truncated
- If asked to HSEM, but the encode data had invalid characters that were translated to spaces

- if asked to HSEM, but the document was hand pocketed or deleted during an exception
- If asked to place the document in an invalid pocket, and the document was sent to the reject pocket (outsorted) instead

Notes:
1. It is possible for xome CAR, HSEM, and pocketing errors to go undetected because those units either do not report all error conditions to track control, or because of operator error.
2. If a document was outsorted due to an HSEM error, and the application dictates not stopping on outsort errors, then this is reported via bit 3 (HSEM Outsort) and not in bit 5 (HSEM incomplete).

Related Properties, Events, and Methods
iMandatoryDevices Property, DocComplete Event, DocProcess Method cStkPocket Property
Type: Short
This property is set by Track Control and is available to applications during the DocComplete Event. It contains the physical pocket number to which the corresponding document was sorted.
Valid Values
This property has a value of 1-X, where 1 is the reject pocket and X is the highest physical pocket on the sorter.
Related Propeties, Events, and Methods
iStkSetLogicalPocketsPath Property, pStkPocket Property, DocProcess Method, DocComplete Event

**Cfg* Properties-Configuration**
Cfg* properties are available after the PoweredUpEvent is received. They are set by the document processor and read by the application. Because system software turns off application device commands for devices that are not fitted, the application is not required to examine these properties. They can be used to verify the application is running on suitable document processor hardware. The following topics describe cfg* properties:
cfgDevicesFifted Property, cfgNumPockets Property, cfgNVMBase Property, cfgNVMLen Property cfgDevicesFitted Property
Type: Long
This property defines a bit map describing the machine configuration. Bit 0 represents the least significant bit.
Notes:
1. This bit mapping is different from the bit map used for the iMandatoryDevices Property
2. More detailed configuration information can be found in the Configuration INI file for your sorter.

Bit            Description

| | | |
|---|---|---|
| | 0 | Feeder fitted |
| | 1 | Manual drop fitted |
| | 2 | Low speed encoder fitted |
| | 3 | Rear rotary stamp fitted |
| | 4 | Front rotary stamp fitted |
| | 5 | Rear endorser fitted |
| | 6 | Front endorser fitted |
| | 7 | Microfilm fitted |
| | 8 | Image fitted |
| | 9 | CAR fitted |
| | 10 | HSEM fitted |
| | 11 | Code line image fitted |
| | 12 | Master printer fitted |
| | 13 | Secondary feeder fitted |
| | 14 | MICR reader fitted |
| | 15 | OCR1 reader fitted |
| | 16 | OCR2 reader fitted |
| | 17-31 | Reserved, set to zero |

This property is available after the PoweredUp Event

Related Properties, Events, and Methods
PoweredUp Event, PowerinaUp Event, PowerUp Method cfgNumPockets Property
Type: Short
This property describes the number of stacker pockets fitted to the machine. It is available after the PoweredUp Event.
Related Properties, Events, and Methods
PoweredUp Event, PoweringUp Event, PowerUp Method cfgNVMBase Property
Type: Long
DP 250/500 only--This property is the base address of the user nonvolatile memory (NVM) area that is mapped to application memory space. C++ and Delphi32 users can use this address to overlay structures on the NVM memory space. The NVM memory space is 48K bytes if NVM recovery is enabled, or 4K bytes if NVM recovery is not enabled. This property is available immediately upon program load and prior to the PoweredUp Event. If you are running the application with a simulator and not using the DP500TCP driver, this property points to a zero initialized segment of conventional memory.
Related Properties, Events, and Methods
CfgNVMLen Prol2ea, PoweredUp Event, PoweringUp Event, PowerUp Method cfgNVMLen Property
Type: Long

DP 250/500 only--This property indicates the nonvolatile memory (NVM) memory segment length with the base address at cfgNVMBase. It is available immediately upon program load and prior to the PoweredUp Event.
Related Properties, Events, and Methods
cfgNVMBase Property

**Ec\* Properties--Exception**
Ec* properties are available after the ExceptionComplete Event is fired. They are set by the document processor and read by the application. The following topic describes ec* properties:
ecManualDropSwitch Property ecManualDropSwitch Property
Type: Boolean
True during an ExceptionComplete Event if the document entry is redirected from the feeder to the manual drop station as part of exception recovery. Flow may then be restarted from the feeder by issuing the ResumeFeeding Method.
DP 1 XXX--This property is always false because there is no manual drop station on the DP 1 XXX.
Related Properties, Events, and Methods
ExceptionComplete Event, ExceptionInProgress Event, ResumeFeeding Method

**Ep\* Properties--Exception in Progress**
Ep* properties are available when the ExceptionProgress Event is fired. The following topics describe the ep* properties:
epExceptionCode Property
epExceptionDevice Property
epExceptionType Property epExceptionCode Property
Type: String
This property defines a 5-byte ACSII string of hexadecimal characters representing a unique error code. This error code describes the exception in progress and is sorter specific. The Exception Handler uses this error code when accessing the error database.
Error Code Example
01 A5 22 01 01
Related Properties, Events, and Methods
epExceptionDevice Property, epExceptionType Property, ExceptionInProgress Event epExceptionDevice Property
Type: Long
This property identifies which device is involved with the exception in progress. Refer to the following table, which defines the bit pattern. Note that bit 0 is the least significant bit.
Bit         Description

| | |
|---|---|
| 0 | Feeder |
| 1 | Manual drop |
| 2 | Low speed encoder |
| 3 | Rear rotary stamp |
| 4 | Front rotary stamp |
| 5 | Rear endorser |
| 6 | Front endorser |
| 7 | Microfilm |
| 8 | Image |
| 9 | CAR |
| 10 | HSEM |
| 11 | Code line image |
| 12 | Master printer |
| 13 | Secondary feeder |
| 14 | MICR reader |
| 15 | OCR1 reader |
| 16 | OCR2 reader |
| 17 | Track |
| 18 | Stacker |
| 19-31 | Reserved, set to zero |

Related Properties, Events, and Methods
epExceptionCode Property, epExceptionDevice Property, epExceptionType Property, ExceptionInProgress Event epExceptionType Property
Type: Long
This property's value describes the type of exception in progress. It is valid only during the ExceptionInProgress Event.

| Value | Description |
|---|---|
| 0 | None |
| 1 | Track error |
| 2 | Feed error, which will result in a feed check (DP 1XXX only) |
| 3 | Start up/power on confidence error/track power up error |
| 4 | Printer error |
| 5 | General |
| 6 | Track jam or missort |
| 7 | DP 1XXX--application is too late to pocket |
| 8 | DP 1XXX--Operator pressed start/stop bar, causing flow to stop. |
| 9 | DP 1XXX--Waiting for operator to press start/stop bar |
| 10 | Pocket full |

Related Properties, Events, and Methods
cDocCompleteStatus Property, epExcetionCode Property, epExceptionDevice Property, epExceptionType Property, ExceptionComplete Event, ExceptionInProgress Event, rRdrDocStatus Property

**I\* Properties--Initialization**
I\* properties are set by the application before issuing the GoReadyToProcess Method.
They define the machine initialization prior to flowing documents. The following topics describe i\* properties:
iEndPosition Property
iEndFontSetUp Property
iEntryIgnoreDogEarError Property
iEntryStopOnBlackBand Property
iHSEMOptions Property
iHSEMOutSort Property
iImgAnnotate Property
iImgAnnotateSA Property
iImgCarSetupFilePath Property
iImgImageDirectory Property
iMandatoryDevices Property
iMfilmLampIntensity Property
iRdrFontLoadPath Property
iStkSetLogicalPocketsPath Property
iXcpHandlerStyle Property
iXcpSecFdrIdentify Property
iXcpSecFdrOptions Property iEncPosition Property
Type: Short
DP 250/500 only--This property defines the encoder start position. It is supported only by the low speed encoder.
Value      Description 0          Standard Position--1/4 inch from the leading edge of the document (default)
1          Venezuelan--3/16 inch from the leading edge of the document
Related Properties, Events, and Methods
pEncOptions Property, GoReadyToProcess Method iEndFontSetUp Property
Type: CString
This property is a path to the configuration file for determining the user-defined fonts and logos available to the front and rear endorsers.
DP 30 Endorser--The character endorser supports two character sizes: large (approximately 10 point) and small (approximately 6 point). Both have 10-characters-per-inch spacing. The large character size does not support lower-case letters. If the large character size is selected and DocEndorserLine1 contains lower-case letters, they are translated to upper-case. If the font file path is not specified, the DP 30 defaults to large characters. pEndFrontLine1 or pEndRearLine1 define the endorse data. Character selection is established in the DP 30 MJE Initialization File.

DP 500 DLME--The DLME character endorser supports a mixture of 15 CPI dual-line endorsement and 7.5 single-line endorsement. pEndFrontLine1 or pEndRearLine1 properties are for the top DLME line and pEndFrontLine2 or pEndRearLine2 properties are for the bottom DLME line. The DLME behavior is not configurable and is unaltered by iEndFontSetUp.

DP 500 SLME--The SLME character endorser supports a single line of 10 CPI. pEndFrontLine1 or pEndRearLine1 properties define the endorse data. The SLME behavior is not configurable and is unaltered by iEndFontSetUp.

DP 250/500 MJE--The MJE supports predefined fonts and downloadable logos. The DP 250/500 MJE Initialization File defines logos required for the next document run. If iEndFontSetUp is not defined, the default endorse fonts are used and the logo bitmaps are undefined.

DP 1825 MJE--The DP 1XXX Stamp and Endorsement Initialization File defines the user-defined fonts and logos to be downloaded into the DP 1825 MJE.

DP 1 1 50 PEP/Stamp--The PEP single-line endorser and rotary stamp positions are set up at this time from the DP 1XXX Stamp and Endorsement Initialization File. Both the stamp and PEP begin printing in areas defined by ABA areas. Note that the PEP and rotary stamp positions cannot be set on a document-by-document basis.

Related Properties, Events, and Methods
pEndFrontLine1, pEndFrontLine2, pEndFrontLine3, pEndFrontLine4, pEndRearLine1, pEndRearLine2, pEndRearLine3, pEndRearLine4 Properties, GoReadyToProcess Method iEntryIgnoreDogEarError Property
Type: Boolean
DP 250/500 only--This property determines whether documents that are detected by the system as dog ear feed errors are stopped in the track after the feeder. If dog ear feed errors are not to be ignored, the system prompts the operator to remove and repair the item and re-enter the item using the manual drop. No application intervention is required.

Related Properties, Events, and Methods
GoReadyToProcess Method iEntryStopOnBlackBand Propefty
Type: Boolean
This property determines whether documents that are detected by the system as black band items cause the feeder to stop. If stop on black band is TRUE, the system generates the BlackBand Event and document flow stops when a black band item is detected.

DP 30 only--There is no black band detection hardware.
DP 250/SW only--The black band item stops in the view1 station.
DP 1XXX only--The black band item goes to a sorted pocket. The application must accept and process it.

Related Properties, Events, and Methods and Events

BlackBand Event, GoReadyToProcess Method iHSEMOptions Property
Type: Long
*Note: This property extends the control of the HSEM for the DP 1150 sorter only.*
The declaration of HSEM exceptions versus HSEM outsort behavior can be defined using the iHSEMOutsort property. The iHSEMOptions property defines extended processing options for the HSEM.

Bit 0        HSEM Dogear Detection. The HSEM detects documents with damaged lower right corners (dogears) and inhibits encoding of these documents. Some users wish to encode all documents by disabling dogear detection.
Valid Values for Bit 0:
1 = Disable Dogear detection
0 = Dogear Detection on (DEFAULT)
Bit 1-31     reserved (set to 0)

Related Properties, Events, and Methods
iHSEMOutsort Property, GoReadyToProcess Method iHSEMOutSort Property
Type: Boolean
This property determines whether or not the items involved in HSEM ignorable errors are outsorted to the reject pocket or treated as a device error. TRUE means documents are outsorted to the reject pocket when HSEM ignorable errors occur during document processing. Documents that are outsorted have a cDocCompleteStatus Property of OUTSORTED (bit 3 set). The exception handler is invoked when HSEM errors occur on 10 consecutive documents. egardless of this property's setting, if this situation occurs, the documents with the consecutive HSEM errors are outsorted, and the exception handler is invoked.

Related Properties, Events, and Methods
cDocCompleteStatus Property, GoReadyToProcess Method ilmgAnnotate Property
Type: CString
This property defines the application annotation data that is stored in the header record of all future image files. The application can use this data to keep information such as business day, type of work, or run number. This annotation is applied to subsequently created files. This property is used only if the ilmgCarSetupFilePath Property is not NULL. The maximum size of the annotation is 128 bytes.

Related Properties, Events, and Methods
ilmaannotate Property, ilmgCarSetupFilePath Property, ilmgImageDirectory Property, GoReadyToProcess Method ilmgAnnotateSA Property
Type: Variant - must be a safe array of unsigned characters.

This property has the same purpose as the ilmgAnnotate property except that this property can contain binary data with embedded NULLs (byte value of 0x00). The content of this structure is not known by the DPOCX or Track Control and is copied without examination. The SA suffix on this property represents "SafeArray". See the \notes\demo\vc40 for a demonstration of the safe array implementation.
Related Properties, Events, and Methods
ilmgAnnotate Property, ImageEndOf File Method ilmgCarSetupFilePath Property
Type: CString
This property is a fully qualified path to the file defining the image and CAR initialization parameters. If this property is set to NULL, no image or CAR setup occurs and document imaging is not enabled. See Image and CAR Initialization File for a detailed description of this file.
Related Properties, Events, and Methods
GoReadyToProcess Method ilmgImageDirectory Property
Type: CString
This property sets the subdirectory for image storage. This is an 8-character field conforming to the directory naming conventions of NT and Novell. This subdirectory name is appended to the default base image storage directory. For example, if the Image Capture Server default base storage directory is C:\Images and the ilmgImageDirectory is MyImages, then images are stored in the C:\Images\MyImages directory. This property is used only if the ilmgCarSetupFilePath Property is not NULL.
Related Properties, Events, and Methods
GoReadyToProcess Method, ilmgCarSetupFilePath Property, plmgCarDocType Property,
plmgFilename Property, plmgOptions Property iMandatoryDevices Property
Type: Long
This property defines a bit map that describes which devices cannot be disabled or missing on the document processor. Disabling a device applies only to the DP 1XXX. The DP 1XXX has a control panel next to the power switch with buttons connected to the track devices. If a mandatory device is disabled by the control panel, the exception handler indicates that the mandatory device must be re-enabled. If a device that is not mandatory is disabled, the operator can enable and disable the device as needed. In this case, the application is informed in the cDocCompleteStatus Property. On all sorter types, if a mandatory device is not fitted, an unrecoverable exception is displayed during the GoReadyToProcess Method. The exception handler displays the error, and the application receives the MachineDead Event once the operator acknowledges the error.
DP 1XXX only--The application enables the HSEM by specifying it as a mandatory device. If it is not defined as mandatory, the application cannot use the HSEM, even if it is fitted. In this case, all HSEM commands in the subsequent DocProcess methods are ignored.

Notes:
1. Not afl bits comprising this property are used on afl sorter types. Exceptions are noted in the following table.
2. Bit 0 is the least significant bit.
3. This bit map is different than the bit map defined for cfgDevicesFitted Property

| Bit | Mandatory Device |
|---|---|
| 0 | MICR |
| 1 | OCR1 |
| 2 | OCR2 |
| 3 | Secondary feeder (not used on DP 30) |
| 4 | Front endorser (MJE) |
| 5 | Rear endorser (MJE or PEP) |
| 6 | Front stamp |
| 7 | Rear stamp |
| 8 | HSEM (not used on DP 30) |
| 9 | Microfilmer (not used on DP 30) |
| 10 | Image |
| 11 | Low speed encoder (not used on DP 1XXX) |
| 12 | Master printer (not used on DP 1XXX) |
| 13 | CAR (not used on DP 30) |

Related Properties, Events, and Methods
cDocCompleteStatus Property, DocProcess Method, GoReadyToProcess Method, MachineDead Event iMfilmLampIntensity Property
Type: Short
DP 250/500 only--This property adjusts the microfilm lamp luminosity. Valid values are 1 to 5 with 5 being the brightest. The default is 3.
Related Properties, Events, and Methods
GoReadyToProcess Method iRdrFontLoadPath Property
Type: CString
This property is a fully qualified path to a reader configuration file. If this property is NULL, no reader code lines are to be returned to the application in the DocReadComplete Event.
DP 30--The reader configuration file contains the configuration details for the single reader that is fitted.
DP 250/500--The reader configuration file contains the configuration details for all three reader positions. Paths to font files are specified, and font switch parameters for each reader are described. CLI is also enabled. See DP 500 Reader Initialization File for details on the file format.

DP 1XXX--The file describes paper handling, the readers, and a general setup for a run. See DP 1XXX Reader Initializabon File for details on the file format.
Related Properties, Events, and Methods
DocReadComplete Event, GoReadyToProcess Method iStkSetLogicalPocketsPath Property
Type: CString
This property is a fully qualified path to the file describing the waterfall pockets configuration. This enables the track control to cascade pockets automatically and to stop the track when a logical pocket is full. If the property is set to NULL, logical pockets map to physical pockets and the reject pocket is set to pocket 1. Pocket names will be assigned according to physical pocket number (1, 2, 3, etc.). See DP Stacker Waterfall Pocket Initialization File for details on the file format.
Related Properties, Events, and Methods
cfgNumPockets Property, pStkPocket Property, GoReadyToProcess Method iXcpHandlerStyle Property
Type: Long
This property defines the options for the Exception Handier (EXCEPT.EXE). This is reserved and must be set to zero.
Related Properties, Events, and Methods
pXcpOptions Property, GoReadyToProcess Method iXcpSecFdrIdentify Property
Type: CString
DP 250/500 only--This is a reserved property.
Related Properties, Events, and Methods
pXcpIdentify Propertym iXcpSecFdrOptions Property, GoReadyToProcess Method iXcpSecFdrOptions Property
Type:Long
DP 250/500 only--This is a reserved property.
Related Properlies, Events, and Methods
pXIdentify Property, GoReadyToProcess Method

**P* Properties--Process Document**
P* properties are set by the application prior to invoking the DocProcess Method. These properties determine the machine operations applied to the document. The following topics describe the p* properties:
pAppDocData Property
pAppDocDataSA Property
pAppDocDIN Property
pEncData Property
pEncOptions Property
pEndFrontFontNumber and pEndRearFontNumber Property pEndFrontLine1, pEndFrontLine2, pEndFrontLine3, pEndFrontLine4,
pEndRearLine1, pEndRearLine2, pEndRearLine3, pEndRearLine4 Properties
pEndFrontLogoNumber and pEndRearLogoNumber Property
pEndFrontLogoPosition and pEndRearLogoPositon Property
pEndFrontOptions and pEndRearOptions Property
pEndFrontPosition and pEndRearPosition Property
pImgCarDocType Property
pImgFilename Property
pImgOptions Property
pMfilmOptions Property
pMfilmVerticalAnnotation Property
pStkPocket Property
pStkWaterfallCascade Property
pStmpFrontPosition, pStmpRearPosition Properties
pStmpOptions Property
pXcpDeleteAllowed Property
pXcpIdentify Property
pXcpOptions Property pAppDocData Property
Type: User Defined
This property must be set to a value before the DocProcess Method is invoked. The property value is returned during the DocComplete Event in the cAppDocData Property. The maximum size of this property is 231 bytes. This information is stored on the Image Capture Server in the .IDX file if the document is being imaged. This property is provided to the application for coordinating the multi-document latency between the DocReadComplete Event and the DocComplete event.
Related Properties, Events, and Methods
cAppDocData Property, DocComplete Event, DocProcess Method pAppDocDataSA Property
Type: Variant - must be a safe array of unsigned characters.
This property has the same purpose as the pAppDocData property except that this property can contain binary data with embedded NULLs (byte value of 0x00). The content of this structure is not known by the DPOCX or Track Control and is copied without examination. The pAppDocData property is not used if this property is set by the application. Applications should also use the cAppDocDataSA property if they set this property. The SA suffix on this property represents "Safe Array". See the \notes\demo\vc40 for a demonstration of the safe array implementation.
Related Properties, Events, and Methods
cAppDocData Property, cAppDocDataSA Property, pAppDocData Property, DocProcess Method, DocComplete Event pAppDocDIN Property
Type: Long

The document identification number (DIN) is an application-level document number that ties document processing by the system software to document processing by the application software. The DIN ranges from 1 to the maximum value that can be contained in a long integer. In the .IDX image format, pAppDocDIN identifies an individual document. This DIN number is returned in the cAppDocDIN Property during the DocComplete Event.

Related Properties, Events, and Methods
cAppDocDIN Property, DocComplete Event, DocProcess Method, repassAppDocDIN Property pEncData Property
Type: CString
The document encode line is a string containing the data to be encoded on this document. The character data of the string is left justfied. The right-most character of this string is encoded as the right-most character on the document. See DP Character Sets for details of allowable encode characters and their corresponding byte values. The pEncOptions Property determines if this property is used and if the HSEM is to be used.

DP 30 If more than 70 characters are referred to by this property, only the first 70 characters are used.

DP 250/500 The following table defines character limits for the encoders. If more than the maximum-allowed characters are referred to by this property, only up to the maximum-allowed characters are used. For example, the low speed encoder character limit is 92. If more than 92 characters are referred to, only the first 92 characters are used. Refer to "Encoder Type" in the DP 30/250/500 Configuration Initialization File to see the specific encoder capabilities for your sorter.

| Encoder | Maximum Characters |
|---|---|
| Low speed encoder | 92 |
| HSEM | 12, 13, or 16 |
| HSEM with full-field encode | 65 |

DP 1150 The DP 1150 supports an optional high speed encoder module. The application must provide exactly the same number of characters as are on the HSEM print drum, which is 16. The number of characters available is set by the HSEMCOLS key in the DP 1XXX Configuration Initialization File.

DP 500, DP 11 50—The following table defines the legal values in the pEncData property for use with the HSEM. Any invalid characters are translated to spaces, and the failure is reported in the cDocCompleteStatus property for that document.

| Font | Amount Field Length | Character Map |
|---|---|---|
| E13B | 10 columns | nnnnAnnnnnnnnnnnA |
| E13B | 11 columns | nnnAnnnnnnnnnnnA |
| CMC7 | n/a | nnnnnnnnnnnnnnnS |

Legend*
n = number or space (0x20, 0x30-0x39)
A = Amount symbol or space (0x20, 0x96)
s = Special symbol or space (0x20, 0x91-0x95)

Related Properties, Events, and Methods
iHSEMOutSort Property, pEncOptions Property, DocProcess Method pEncOptions Property
Type: Long
This property is a collection of flags that control the encode process.
*Note:* Bit 0 is the least significant bit.

| Bit | Value | Description |
|---|---|---|
| Bit 0--Encode Active | 1 | Encode operation requested |
|  | 0 | No Encode for this item |
| Bit 1 --Use HSEM* | 1 | Use HSEM for encoding if possible |
|  |  | Do not use HSEM |
| Bits 2 through 31 | 0 | Reserved |

Legend
* This bit is not used on the DP 30.
If all documents are to be encoded, Encode Active can be set to TRUE one time at the beginning of a run. pEncData Property is the requested encode data. If the HSEM is requested, the buffer is parsed and any encoding that can be performed on the HSEM is directed to that device. This enables the same program to run on a machine with or without a HSEM.
DP 250/500--See the HSEM optimization parameter in the DP 500 Reader Initialization File.
DP I XXX--Bit 0 and bit 1 must both be set because the DP 1XXX supports only the HSEM. When using the HSEM, track speed must be set to 500 in the DP 1XXX Reader Initialization File.
Related Properties, Events, and Methods
pEncData Property, DocProcess Method pEndFrontFontNumber and pEndRearFontNumber Property
Type: Short
These properties are defined only for the DP 250/500 and DP 1XXX multijet endorser (MJE). Set this property to 0 if you are not using the MJE hardware. If an invalid font is specified, or if an MJE module is installed but this property is 0, this property is reset to the default value of font 6. Font numbers 1 through 7 are for predefined fonts. The following table defines the predefined fonts.

| Font No. | Description | Lines of Print | Characters Per Inch | DP 500 Maximum Characters | DP 500 Max. Line Length | DP 1XXX Max. Line Length |
|---|---|---|---|---|---|---|
| 1 | 1-line large | 1 | 5 | 45 | 45 | 64 |
| 2 | 1-line medium | 1 | 7.5 | 70 | 70 | 64 |
| 3 | 2-line | 2 | 10 | 180 | 90 | 64 |
| 4 | 3-line | 3 | 10 | 180 | 60 | 64 |
| 5 | 4-line | 4 | 10 | 180 | 45 | 64 |

| 6 | SLME emulation | 1 | 10 | 90 | 90 | 64 |
| 7 | DLME emulation | 2 | 15 | 180 | 90 | 64 |

Based on the font number chosen, each endorser line is truncated to the maximum line length. The DP 1XXX MJE supports downloaded fonts; refer to the DP 1XXX Stamp and Endorsement Initialization File. The DP 1XXX MJE supports 8 downloadable fonts, 15 downloadable logos, and a total of 4 lines of print on each the MJE front and MJE rear. These properties are ignored on the DP 1XXX if the iEndFontSetUp property is null.

Related Properties, Events, and Methods
iEndFontSetUp Property, pEndFrontLine1, pEndFrontLine2, pEndFrontLine3, pEndFrontLine4, pEndRearLine1, pEndRearLine2, pEndRearLine3, pEndRearLine4, pEndFrontLogoNumber and pEndRearLogoNumber, pEndFrontLogoPosition, pEndRearLogoPosition, pEndFrontOptions and pEndRearOptions, pEndFrontPosition and pEndRearPosition Property, DocProcess Method pEndFrontLine1, pEndFrontLine2, pEndFrontLine3, pEndFrontLine4, pEndRearLine1, pEndRearLine2, pEndRearLine3, pEndRearLine4
Type: CString
The document endorse line is a string containing the data to be endorsed on the next document. The character data of this string is left justified. For rear endorsements, the left-most character of this string is endorsed as the character closest to the leading edge of the document. For front endorsements, the left-most character of this string is endorsed as the character closest to the trailing edge of the document. The number of allowable characters and lines of endorsement text depends on the type of endorser used and, if multiple fonts are supported by the endorser, the font number selected. If any data is truncated, the application is informed in the cDocCompleteStatus property for that document. For all endorsers except the DP 1XXX PEP, see DP Character Sets for a list of valid endorsement characters.
DP 250/500 SLME/DLME--A maximum of 60 characters for each endorse line is allowed.
DP 250/500/1150/1825 MJE--The number of characters per line and the number of lines per document are defined by the font selected. See the pEndFrontFontNumber and pEndRearFontNumber Property.
DP 1825 PEP--Only uppercase characters, numbers, and spaces are permitted. Invalid characters are translated to spaces. A maximum of 40 characters will be printed; excess characters are truncated.
DP 1XXX--This property is ignored if the iEndFontSetUp proprty is null.
Related Properties, Events, and Methods
iEndFontSetUp Property, pEndFrontFontNumber and pEndRearFontNumber Propertv,
pEndFrontOptions and pEndRearOptions Property, pEndFrontPosition and pEndRearPosition Property, DocProcess Method pEndFrontLogoNumber and pEndRearLogoNumber Property

Type: Short
These properties are defined only for the DP 250/500 and DP 1XXX multijet endorser (MJE).

| Value | Description |
|---|---|
| 0 | No logo |
| 1 through 16 | Selects a previously downloaded logo |

The logo prints only if the appropriate pEndFrontOptions and/or pEndRearOptions Property has turned on the endorser. If an invalid logo is selected, no logo is printed, and the application is informed of this in the cDocCompleteStatus property for that document. This property is ignored if the iEndFontSetUp property is null.

Related Properties, Events, and Methods
iEndFontSetUp Property, pEndFrontLogoPosition and pEndRearLogoPosition Property,
pEndFrontOptions and pEndRearOptions Property, DocProcess Method pEndFrontLogoPosition and pEndRearLogoPosition Property
Type: Short
DP 250/500 MJE, DP 1150 MJE--The logo position is defined in 1 /10 inch increments from the leading edge of the document. If the logo and text positions overlap, the logo is blanked out wherever the endorsement text overlaps the logo. Creating the logo with extra "white space" allows you to fine tune the positioning of the logo.
DP 1825 MJE--This property is ignored, since text and logos cannot be positioned independently of each other on the DP 1825 MJE. Positioning of both text and logos is done via the pEndFrontPosition and pEndRearPositon Properties. If the defined text and logo areas overlap, the text and graphic are merged together, printing on top of each other. Creating the logo with extra "white space" allows you to fine tune the positioning of the logo.
DP 1XXX PEP/Stamp Endorser--When using DP 1XXX PEP endorsers, stamp position is determined by the DP 1XXX Stamp and Endorsement Initialization File. In general, custom logos are created using Windows Paintbrush and converting the resulting *.bmp files to a format acceptable to the particular endorser on your sorter. If your particular endorser supports this feature, then the logo conversion utility is installed on the Track PC along with the Common API software. For instructions on creating the DP 1150 MJE logos, see the DP 1150 MJE Logo Conversion Utility'shelp ile. Logos are not directly interchangeable between endorser types. However, a single *.bmp file can be converted individually for each type of MJE.
Related Properties, Events, and Methods
pEndFrontLogoNumber and pEndRearLogoNumber Property, pEndFrontOptions and pEndRearOptions Property, DocProcess Method pEndFrontOptions and pEndRearOptions Property
Type: Long
This property defines a collection of flags controlling the endorse process.
*Note:* Bit 0 is the least significant bit.

| Bit | Value | Description |
| --- | --- | --- |
| Bit 0--Endorse Active* | 1 | Endorse operation requested |
| | 0 | No endorse for this item |
| Bit 1 --End Trailing Edge: DP 30 | 1 | Orient the endorse position from the trailing edge of the document |
| | 0 | Orient the endorse position from the leading edge of the document |
| Bit 1 --End Trailing Edge: DP 500 and DP 1XXX MJE | 1 | Endorsement position (1.4 inches adjacent to the trailing edge) |
| | 0 | pEndFrontPosition and pEndRearPosition Property contains the endorsement position |
| Bit 2--DP 30 | | Reserved |
| Bit 2--Logo Trailing Edge: DP 500 | 1 | Endorsement position (1.4 inches adjacent to the trailing edge) |
| | 0 | pEndFrontLogoPosition and pEndRearLogoPosition Property contains the logo position |
| Bits 3 through 31 | 0 | Reserved |

Legend
* For DP 1XX PEP endorsers, only bit 0 is used. Trailing and leading edge information is determined by the DP 1XXX Stamp and Endorsement Initialization File.

If all documents are to be endorsed, Endorse Active can be set to TRUE one time at the beginning of a run. This property is ignored if the iEndFontSetUp property is null.

Related Properties, Events, and Methods
pEndFrontLine1, pEndFrontLine2, pEndFrontLine3, pEndFrontLine4, pEndRearLine1, pEndRearLine2, pEndRearLine3, pEndRearLine4 Properties, pEndFrontPosition and pEndRearPosition Property, DocProcess Method pEndFrontPosition and pEndRearPosition ProperW
Type: Short
The document endorse margin is an offset in 1/10th inches from the edge specified in the pEndFrontOptions and pEndRearOptions Property. For the DP 500, this is always the leading edge of the document. Refer to pEndFrontOpttons and pEndRearOptions Property for the end trailing edge DP 500 endorsement option.

The minimum value for this property is 0. For US banking, see Endorsement Areas for more information on areas 1 through 4.

DP 1XXX--When using DP 1XXX PEP endorsers, position is determined by the DP 1XXX Stamp and Endorsement Initialization File. For the DP 1XXX MJE, the property is rounded to the nearest inch and it affects the logo position as well. If the application needs better positioning control, insert spaces into the endorsement text. This property is ignored if the iEndFontSetUp propety is null.

Related Properties, Events, and Methods iEndFontSetUp Property, pEndFrontLine1, 12EndFrontLine2, pEndFrontLine3, pEndFrontLine4, pEndRearLine1, pEndRearLine2, pEndRearLine3, pEndRearLine4 Properties, pEndFrontOptions and pEndRearOptions Property, DocProcess Method pImgCarDocType Property
Type: Short

This property determines the entry from the CAR parameter file to be applied to this document. if pImgCarDocType is set to 0, CAR is not performed on the document. The CAR parameter file name is supplied by the application in the CARPARAMFILENAME key in the file specified by the iImgCarSetupFilePath Property. This property is ignored if the iImgCarSetupFilePath property is null.

Related Properties, Events, and Methods iImgCarSetupFilePath Property, DocProcess Method pImgFilename Property
Type: CString

The image file name is the name of the file in which the next document image is stored. This is an 8-character field conforming to the file naming conventions of NT and Novell. The file is created in the directory specified in the iImgImageDirectory Property. Refer to the IDX Image Storage File Structure for information about the image storage format. This property is ignored if the iImgCarSetupFilePath property is null.

DP 30--The system software appends the appropriate suffixes to the file names. The valid suffixes are .JPG for single documents compressed using JPEG format and TIF for single documents compressed using CCITT format. JPG files follow the JPEG industry standard file structure. TIFF files follow the 6.0 TIFF industry standard. If the OUTPUTTYPE key in the iImgCarSetupFilePath Property specifies a single document per file, the application must change the file name for every document to avoid overwriting and losing images.

DP 1XXX--If the document is in a feed check, the pImgFilename property is ignored. All imaging is turned off until flow stops after the feed check. For more information about feed checks, see the cDocCompleteStatus property.

Related Properties, Events, and Methods

ImgAnnotate Property, iImgCarSetupFilePath Property, iImgImageDirectory Property, DocProcess Method pImgOptions Property
Type: Long

This property is a collection of flags controlling the image process. This property is ignored if the ilmgCarSetupFilePath Property is null.
*Note:* *Bit 0 is the least significant bit.*

| Bit | Value | Description |
| --- | --- | --- |
| Bit 0--Store Front Image 1 | 1 | Capture on front image camera 1 |
|  | 0 | No capture |
| Bit 1--Store Front Image 2 | 1 | Capture on front image camera 2 |
|  | 0 | No capture |
| Bit 2--Store Rear Image 1 | 1 | Capture on rear image camera 1 |
|  | 0 | No capture |
| Bit 3--Store Rear Image 2 | 1 | Capture on rear image camera 2 |
|  | 0 | No capture |
| Bit 4--Close Last Batch | 1 | This is the first document of a new batch; flag the last file opened as EOF. The pImgFilename property should be different for this document than for the previous document. |
|  | 0 | No action |
| Bit 5--Close This Batch | 1 | This is the last document of a batch; flag the current batch as EOF when this document is stored. If more documents are to be processed, the next document's pImgFilename property should reference a different file name than the current document. |
|  | 0 | No action |
| Bits 6 through 31 | 0 | Reserved |

Related Properties, Events, and Methods
ilmgAnnotate Property, ilmgCarSetupFilePath Property, ilmgImageDirectory Property, DocProcess Method pMfilmOptions Property
Type: Long
This property is a collection of flags controlling the microfilm process for each item.
*Note:* *Bit 0 is the least significant bit.*

| Bit | Value | Description |
| --- | --- | --- |
| Bit 0--Microfilm Active | 1 | Microfilm this document |
|  | 0 | No microfilm |

| Bit 1 --Left Blip Active | 1 | Apply the left blip to the microfilm when microfilming this document |
| | 0 | No left blip |
| Bit 2--Right Blip Active | 1 | Apply the right blip to the microfilm when microfilming this document |
| | 0 | No right blip |
| Bits 3 through 31 | 0 | Reserved |

Related Properties, Events, and Methods
pMfilmVerticalAnnotation Property, DocProcess Method pMfiimVerticalAnnotation Property
Type: CString
This property defines the numeric annotation applied between the front and rear sides of the document images on the microfilm.
DP 250/500--Up to 9 characters can be placed on the film.
DP 1XXX--Up to 12 alphanumeric characters (letters, numbers, and spaces) can be placed on the film. Characters are first validated, and any invalid characters are changed to a question mark "?" before being placed on the film. This property is required and must be unique if the key MFILMTRACKINGON = 1 in the DP 1XXX Reader Initialization File. If this property is not supplied, then MFILMTRACKINGON is set to zero until the next GoReadyToProcess method.
Related Properties, Events, and Methods
pMfilmOptions Property, DocProcess Method pStkPocket Property
Type: Short
This property describes the pocket number for the current document being processed. If the pocket number is invalid, the document is sorted to the reject pocket. If waterfall pockets are defined, the pocket number refers to the logical pocket number. Waterfall pocket sets can be defined in a file specified by the iStkSetLogicalPocketsPath Property. Both logical and physical pockets are numbered sequentially starting with 1.
Related Properties, Events, and Methods
cStkPocket Property, iStkSetLogicalPocketsPath Property, DocProcess Method pStkWaterfallCascade Property
Type: Short
Valid Values
0 = No cascade
1 = Cascade after pocketing this document
2 = Cascade before pocketing this document
This property controls cascading of documents within a logical pocket set. See the DP Stacker Waterfall Pocket.INI File for a description on how to define logical pocket sets. pStkWaterfallCascade is used to force a cascade to the next physical pocket in a logical pocket set. Based on the value of pStkWaterfallCascade the cascade will occur before or after the pocketing of this document.
Example
1. Physical pockets 10-15 are part of logical pocket set 4 in the order 10-15.
2. Documents sent to logical pocket 4 are initially sent to physical pocket 10.
3. The application decides to cascade to physical pocket 11.
4. The application sets the pStkWaterfallCascade property to 1 or 2 the next time it processes a document to logical pocket 4.

Important Note
A cascade will not occur if the application performs a cascade for a logical pocket and Track Control determines that this logical pocket is currently using the last physical pocket in its set. In other words, the cascade feature does not automatically wrap back to the beginning of a logical pocket set. Instead Track Control will declare a logical pocket full exception. All the items processed to a full logical pocket before the track is stopped are sent to the last pocket of the logical pocket set. The exception handler guides the operator through logical pocket full exception. The application state is not changed even though flow was temporarily stopped. The application will receive the ExceptionInProgress and ExceptionComplete event for this error scenario. An application can use the rPktSetsCantCascade properties if the above described logical pocket full exception is undesirable. For more details, see rPktSetsCantCascade1 and rPktSetsCantCascade2.

Related Properties, Events, and Methods
iStkSetLogicalPocketsPath Property, pStkPocket Property, rPktSetsCantCascade1, iPktSetsCantCascade2 Properties, DocProcess Method, StkResetPockets Method pStmpFrontPosition, pStmpRearPosition Properties
Type: Short
DP 30--The stamp position is an offset 1/10-inch from the leading or trailing edge of a document. The leading edge values range from 0 through 77. The trailing edge value remains constant at 15.
DP 250/500--The front stamp position is fixed and is subject to the document's length. The rear stamp position is defined as an offset in 1/10th inches from the leading-edge of a document. The values range from 0 through 35. Refer to the pStmpOptions Property for rear stamp options.
DP 1XXX--This property does not apply. The DP 1XXX stamp position is defined by the DP 1XXX Stamp and Endorsement Initialization File. This property is ignored if the iEndFontSetUp property is null.

Stamp Endorsement Example (valid for all sorter platforms)
For US banking, the endorsement areas are as follows:
- Payee endorsements is 1.5 inches (3.81 cm) with the pStmpRearPosition property set to the trailing edge.
- Second transit endorsement is 1.5 inches (3.81 cm) with the pStmpRearPosition property set to the leading edge.
- Bank of first deposit is 3.0 inches (7.62 cm) with the pStmpRearPosition property set to the leading edge.

- First transit endorsement is 0.05 inches (0.13 cm) with the pStmpRearPosition property set to the leading edge. The system ensures that a stamp position set to 0 is within first transit endorsement.

Related Properties, Events, and Methods
pStmpOptions Property, DocProcess Method pStmpOptions Property
Type: Long
This property is a collection of flags controlling the stamp process.
DP1XXX--This property is ignored if the iEndFontSetUp property is null.
*Notes:*
1. *Only bits 0 and 2 are defined for the DP 1XXX. Stamp position for the DP 1XXX is defined by the DP 1XXX Stamp and Endorsement Initialization File.*
2. *Bit 0 is the least signfficant bit.*
3. *The DP 30 supports either the front or rear stamp. The DP 500 can support both.*

| Bit | Value | Description |
| --- | --- | --- |
| Bit 0--Rear Stamp Active | 1 | Rear stamp this document |
|  | 0 | No stamp |
| Bit 1 --Rear Stamp Leading Edge | 1 | Rear stamp (1.4 inches or 3.4 adjacent to the trailing edge) |
|  | 0 | Rear stamp position contained in pStmpRearPosition property |
| Bit 2--Front Stamp Active | 1 | Front stamp this document |
|  | 0 | No stamp |
| Bits 3 through 31 | 0 | Reserved |

Related Properties, Events, and Methods
pStmpFrontPosition, pStmpRearPosition Properties, DocProcess Method pXcpDeleteAllowed Property
Type: Boolean
This flag specifies whether or not the exception handler (EXCEPT.EXE) permits an operator to delete this item during exception processing. The valid values are TRUE and FALSE. The default value is TRUE. When set to TRUE, the operator can delete the document. When set to FALSE, the operator cannot delete the document. This ensures proper processing of documents that are required to be reprocessed. Such documents, for example batch separation tickets, are most likely not to be deleted by an operator during exception processing.
Related Properties, Events, and Methods
DocProcess Method pXcpIdentify Property

Type: CString
This property defines the text string that is displayed to identify the current document to the operator during exception reprocessing. The string length is from 1 to 48 characters. If pXcptIdentify is set to NULL, the pXcpOptions Property determines how exception documents are identified.
Related Properties, Events, and Methods
pXcpOptions Property, DocProcess Method pXcpOptions Property
Type: Long
The pXcpOptions property defines the options for the document during exception reprocessing. Bits 0, 1, and 2 define which logical reader codelines are not used during exception handling. The contents of reader codelines 1, 2, and 3 are defined in the reader INI file for your sorter.
*Note: Bit 0 is the least significant bit.*

| Bit | Value | Description |
| --- | --- | --- |
| 0 | 1 | Inhibit reader 1. |
|   | 0 | Use reader 1 code line if available. |
| 1 | 1 | Inhibit reader 2. |
|   | 0 | Use reader 2 code line if available. |
| 2 | 1 | Inhibit reader 3. |
|   | 0 | Use reader 3 code line if available. |
| 3 |   | Defines StartOfTransaction (DP 1XXX only). |
|   | 1 | This document is the first document of a transaction. See below. |
|   | 0 | No transaction checking. |

DP 1XXX pairs mode transactional integrity
There are some applications (such as remittance processing) that require all documents that are part of a single transaction to remain together during document sorting. Feedcheck conditions create special problems for applications attempting to maintain transaction integrity. This is because a feedcheck can split a transaction by sending the feedcheck items to the reject pocket, whereas the rest of the transaction that is not involved in the feedcheck is sent to a valid sorted pocket. There are two approaches to maintaining transaction integrity, depending on the number of documents that compose a transaction:

Transactions of more than two documents--The application should set STOPONFEEDCHECK=1 in the reader ini file. This guarantees that transactions that would be split due to a feedcheck will remain intact when the feedcheck documents are refed.

Transactions of one or two documents--The application can use the above method successfully, or, if higher document throughput is desired, the application can set STOPONFEEDCHECK=0 and set the "StartOfTransaction" flag in the pXcpOptions property for each document that starts a new transaction. (Note that each batch separator ticket should also be marked as "StartOfTransaction".) In this configuration, Track Control assures that any document marked as "StartOfTransaction" that is fed just prior to a feedcheck is not separated from the feedcheck document that follows it. The entire transaction will be sent to the reject pocket and be marked as being involved in the feedcheck. It should be noted that the StartOfTransaction document will have been encoded, endorsed, microfilmed, imaged, etc., as requested by the application, but the remaining feedcheck documents will not have been.

Note that a transaction can still be broken at the tail end of the feedcheck. For example, the start of a transaction may be the last document fed during the feedcheck. In the case when flow resumes after the feedcheck, the application must recognize that the first document read is not the start of a transaction and should be rejected, so that the entire transaction is in the reject Pocket together.

Related Properties, Events, and Methods
iXcpHandierStyle Property
pXcpIdentify Property

**R* Properties--Reader**
R* properties are valid after the DocReadComplete Event has started. They are set by the document processor and read by the application. The following topics describe r* properties:
rPktSetsCantCascade1, rPktSetsCantCascade2 Properties
rPktSetsNearfull1, rPktSetsNearfull2 Properties
rRdr1CantReadCount, rRdr2CantReadCount, rRdr3CantReadCount Properties
rRdr1CodeLine, rRdr2CodeLine, rRdr3CodeLine Properties
rRdrDocLength Property
rRdrDocStatus Prgperty
rRdrMICRAnalogCantReadCount and rRdrMICRDigitalCantReadCount Properties ⇐ Updated rPktSetsCantCascade1, rPktSetsCantCascade2 Properties
Type: Long
These properties are available to the application during the ReadComplete event. They are bit patterns that represent which logical pocket sets are currently sorting to the last physical pocket in their defined sets. Property rPktSetsCantCascade1 is for logical sets 1-31, and rPktSetsCantCascade2 is for logical sets 32-48. See the DP Stacker Waterfall Pocket.INI File section for details on how to define logical pocket sets. Each bit of these properties represents a different logical pocket set. This pocket-to-bit mapping is defined by the following diagrams:

rPktSetsCantCascade1

| Bit: | 31 | 30 | 29 | --- | 4 | 3 | 2 | 1 | 0 |
|---|---|---|---|---|---|---|---|---|---|
| Pocket set: | * | 31 | 30 | --- | 5 | 4 | 3 | 2 | 1 | rPktSetsCantCascade2

| Bit: | 31 | 30 | --- | 17 | 16 | --- | 2 | 1 | 0 |
|---|---|---|---|---|---|---|---|---|---|
| Pocket set: | * | ** | --- | ** | 48 | --- | 34 | 33 | 32 |

Legend
*     Bit 31 in each property is reserved as the sign bit.
**    Bits 17-30 in rPktSetsCantCascade2 are reserved.

A request to cascade within a logical pocket set (see pStkWaterfallCascade) is not actioned when sorting to the last physical pocket in a logical pocket set. A logical pocket full exception occurs instead. An application using the pStkWaterfallCascade feature can use these properties to avoid a logical pocket full exception. See the pStkWaterfallCascade property for a desciption of the logical pocket full exception.

Note: *The use of the rPktSetCantCasadeX properties is not required unless an application is using the pStkWaterfallCascade feature and it cannot tolerate extra items in the last pocket of a logical pocketset.*

Examples

If rPktSetsCantCascade1 has a value of 3, then logical pocket sets 1 and 2 are currently sorting to the last physical pockets defined in their sets. The following is a scenario (DP35, DP250 or DP500) where this property could be used to avoid a logical pocket full exception and extra items in the last pocket of a logical set.

1. An application receives a DocReadComplete event for the next document. The rPktSetsCantCascadeX properties are updated during each read complete event.
2. The application determines that the next document is to be pocketed in logical pocket 4 and a cascade BEFORE is required.
3. The rPktSetCantCasade1 property shows that logical pocket 4 is currently on the last physical pocket of the set. A cascade to the next pocket cannot be done. The application decides to have the logical set emptied and reset before processing this document.
4. The application issues a StkResetPockets method for logical pocket 4.
5. Track control turns on the pocket lights for all the physical pockets in logical set 4.
6. The application prompts the operator to empty all the pockets in logical set 4.
7. The operator acknowledges the application prompt.
8. The application processes the document WITHOUT cascade. The document is sorted to the first physical pocket in logical pocket set 4.

A logical pocket full exception is almost unavoidable on a DP 1XXX because the DP 1XXX cannot halt documents in the track like the other sorters. If a logical pocket full condition must be avoided on a DP 1XXX sorter, the application can do the following:

1. Keep a count of the number documents sent to last pocket of each logical pocket set. The application can use the rPktSetsCantCascadeX properties to trigger when a set is now on its last pocket.

2. The application can issue the FlowStop Method when a threshold count is reached for the last pocket of a set.
3. The application can issue the StkResetPockets method for one or more sets after the FlowStopped Event is received.

Related Properties, Events, and Methods
iStkSetLogicalPocketsPath Property
pStkPocket Property
pStkWaterfallCascade Property
DocReadComplete Event
DocProcess Method
StkResetPockets Method rPktSetsNearfull1, rPktSetsNearfull2 Properties
Type: Long
These properties are available to the application during the DocReadComplete event. They are bit patterns that represent which logical pocket sets are currently near full. rPktSetsNearFull1 is for logical sets 1-31 and rPktSetsNearFull2 is for logical sets 32-48. A logical set is near full when it is sorting to the last pocket defined in a logical set and the count of documents sorted to this last pocket is close to the application defined DOCSPERPOCKET value. See the.DP Stacker Waterfall Pocket INI File section for details on how to define logical pocket sets and the DOCSPERPOCKET value. Each bit of these properties represents a different logical pocket set. This pocket-to-bit mapping is defined by the following diagrams:

rPktSetsNeartull1

| Bit: | 31 | 30 | 29 | --- | 4 | 3 | 2 | 1 | 0 |
|---|---|---|---|---|---|---|---|---|---|
| Pocket set: | * | 31 | 30 | --- | 5 | 4 | 3 | 2 | 1 | rPktSetsNearfull2

| Bit: | 31 | 30 | --- | 17 | 16 | --- | 2 | 1 | 0 |
|---|---|---|---|---|---|---|---|---|---|
| Pocket set: | * | ** | --- | ** | 48 | --- | 34 | 33 | 32 |

Legend
* Bit 31 in each property is reserved as the sign bit.
** Bits 17-30 in rPktSetsNearfull2 are reserved.

The DOCSPERPOCKET feature does not automatically wrap back to the first pocket in a logical set when the last physical pocket in the set is full. Instead a logical pocket full exception occurs. An application using the DOCSPERPOCKET feature can use these properties to avoid a logical pocket full exception.

*Note: The use of the rPktSetsNearFullX properties is not required unless an application is using the DOCSPEPPOCKET feature and it cannot tolerate extra items in the last pocket of a logical pocketset.*

The corresponding bit for a logical pocket set is turned on when the count of
documents sorted to the last pocket in the set is close to the DOCSPERPOCKET
value. See the following for a definition of "close" on each sorter type:
   DP35, DP250, DP500   =   DOCSPERPOCKET - 5
   DP 1XXX              =   DOCSPERPOCKET - 10
Example
If rPktSetsNearFull2 has a value of 3 then logical pocket sets 32 and 33 are near
full. One or more of the bits may be on at the same time. The following is a
scenario where this property could be used to avoid a logical pocket full exception
and extra items in the last pocket of a logical set.
1. An application receives a DocReadComplete event for the next document. The rPktSetsNearFullX properties are updated during each read complete event.
2. The rPktSetNearFull property shows that logical pocket 4 is currently near full. The application decides to have the logical set emptied.
3. The application issues a FlowStop method. The application handles all the items currently in progress while waiting for the FlowStopped event.
   Note: *Multiple sets may become near full simultaneously. The application should issue the FlowStop method only once.*
4. Once the FlowStopped event is received, the application issues a StkResetPockets method for logical pocket 4.
5. Track Control turns on the pocket lights for all the physical pockets in logical set 4.
6. The application prompts the operator to empty all the pockets in logical set 4.
7. The operator acknowledges the application prompt.
8. The application issues the FlowStart method.
9. Track Control turns off the pocket lights for all the physical pockets in logical set 4.
10. Track Control turns off the corresponding bit in rPktSetsNearFull1 for logical set 4.
11. Further documents intended for logical set 4 are sorted to the first pocket in logical set 4.

Related Properties, Events, and Methods
iStkSetLogicalPocketsPath Property, pStkPocket Property, DocReadComplete Event, FlowStart Method, FlowStop Method, StkResetPockets Method rRdr1CantReadCount, rRdr2CantReadCount, rRdr3CantReadCount Properties
Type: Short
This property defines the number of can't read characters (1 Ah characters) in each
code line. There is a limit on the DP 1XXX MCR readers; they do not return leading
edge can't read characters. Refer to the rRdrMICRAnalogCantReadCount and
rRdrMICRDigitalCantReadCount Properties to get the full count If the
iRdrFontLoadPath property is NULL, no reader code lines are to be returned to the
application in the DocReadComplete Event, and the rRdrXCantReadCount
properties have a value of zero.
Related Properties, Events, and Methods rRdr1CodeLine, rRdr2CodeLine, rRdr3CodeLine Properties
rRdrMICRAnalogCantReadCount and rRdrMICRDigitalCantReadCount Properties
DocReadComplete Event rRdr1CodeLine, rRdr2CodeLine, rRdr3CodeLine Properties
Type: CString
This property defines the reader code line, including spaces (except for the DP 1XXX MICR readers). The maximum code line is 95 characters. The first character in the buffer is the leftmost character of the code line. Spaces are not compressed from the code line. See DP Character Sets for the ASCII values returned by the readers for valid characters. The physical reader that maps to each of these properties is defined in the DP 250/500 Reader Initialization File or the DP 1XXX Reader Initialization File. If the iRdrFontLoadPath property is NULL, no reader code lines are to be returned to the application in the DocReadComplete Event, and the rRdrXCodeLine properties have a value of zero.

DP 500--If you are using OCR readers and performing font switching, the following characters may be returned within the reader code line string. They mark the font switch occurrences.

| Value | Description |
| --- | --- |
| 0XC0 and 0xC1 | Font switch on string occurred. |
| 0XD0 through 0xD7 | Font switch on position occurred. |

Related Properties, Events, and Methods
rRdr1 CantReadCount, rRdr2CantReadCount, rRdr3CantReadCount Properties
DocReadComplete Event rRdrDocLength Property
Type: Short
DP 250/500 only--This property describes the document length in 10ths of inches. It is valid only if the reader options are set up to request the document length. This option can be set in the file specified by the iRdrFontLoadPath Property. If the iRdrFontLoadPath property is NULL, no reader code lines are to be returned to the application in the DocReadComplete Event, and the rRdrDocLength property has a value of zero.

Related Properties, Events, and Methods
iRdrFontLoadPath Property, DocReadComplete Event rRdrDocStatus Property
Type: Long
This property indicates information that describes the special conditions, such as feed check items, associated the document.
*Note: Bit 0 is the least significant bit.*

| Bit | Value | Description |
| --- | --- | --- |
| 0 (DP 1XXX only) | 1 | DP 1XXX feed check item that will be rejected. This item is flagged as a feed check item in cDocCompleteStatus Property. |

|   |   |   | The application should not enable any devices on this document and should send this document to the reject pocket when issuing the DocProcess method for this document. |
|---|---|---|---|
|   |   | 0 | Normal. |
|   | Bits 1 through 31 | 0 | Reserved. |

Related Properties, Events, and Methods
DocReadComplete Event rRdrMICRAnalogCantReadCount and
rRdrMICRDigitalCantReadCount Properties
Type: Shorl
These properties are valid only on the DP 1XXX. HSEM applications that need to detect overencoded amount fields use this property. The rRdr1CantReadCount, rRdr2CantReadCount, rRdr3CantReadCount Properties do not report the number of leading can't read characters in the codeline. This makes it difficult for applications that need to detect overencoded amount fields. The rRdrMICRAnalaogCantReadCount and rRdrMICRDigitalCantReadCount Properties report the total number of can't read characters from the Analog MICR reader and the Digital MICR reader, respectively (when in resolved reader mode). This includes the leading can't read characters. If the iRdrFontLoadPath property is NULL, no reader code lines are to be returned to the application in the DocReadComplete Event, and the rRdrMICRXXXCantReadCount properties have a value of zero.
Related Properties, Events, and Methods
rRdr1CantReadCount, rRdr2CantReadCount, rRdr3CantReadCount Properties
rRdr1 CodeLine, rRdr2CodeLine, rRdr3CodeLine Properties
DocReadComplete Event

**Rec\* Properties--Recovery from Power Failure**
DP 250/500 only--Rec\* properties are initially set by the track when the RecoveryComplete Event is started. The recDocIndex Property is then set by the application to index the list of recovery documents. See NVM Recovery for the nonvolatile memory (NVM) recovery process description. The following topics describe the rec\* properties:
recDocCount Property
recDocIndex Property recDocCount Property
Type: Short
DP 250/500 only--This property indicates the number of documents in the recovery list. A value of 0 indicates that no documents are available for recovery.
Related Properties, Events, and Methods
recDocIndex Property, RecoveryComplete Event recDocIndex Property
Type: Short
DP 250/500 only--This property recovers document data after an abnormal termination. It depends on data stored in NVM by track control. The values range from 0 to recDocCount-1. When recDocIndex is set, the c* properties are set to the value of the corresponding previously processed document. A value of 0 is the document originally processed first. The application reprocesses data by using a control loop from 0 to recDocCount-1.
Related Properties, Events, and Methods
C* Properties-Document Completion, recDocCount Property, RecoveryComplete Event

**Repass* Propetlies--Repass Documents**
The repass properties allow the application to control the reprocessing of individual documents during exception handling. They are valid during the RepassVerify Event handling. The following topics describe the repass* properties:
repassAppDocDIN Property
repassControl Property
repassRdr1CantReadCount, repassRdr2CantReadCount,
repassRdr3CantReadCount Properties
repassRdr1CodeLine, repassRdr2CodeLine, repassRdr3CodeLine Properties
repassRdrDocLength Property
repassRdrDocStatus Property repassAppDocDIN Property
Type: Long
This property returns the value of the pAppDocDIN originally set for this document by the application. The application can use this value to aid in exception reprocessing during the RepassVerify Event.
Related Properties, Events, and Methods
pAppDocDIN Property, RepassVerify Event repassControl Property
Type: Long
This property is set by the application during the RepassVerify Event handling to specifiy the reprocessing options for a repass document.
*Note: Bit 0 is the least significant bit.*

| Bit | Value | Description |
| --- | --- | --- |
| Bits 0 through 3 | 0000 | Default exception handler repass processing. The exception handler prompts the operator to verify the repassed items that do not compare. |
| | 0001 | Items compare; reprocess the document. |
| | 0002 | Items do not compare; reject the repass document, mark the item as deleted, and continue reprocessing. |

| | | DocComplete event for the item that will be deleted. |
| --- | --- | --- |
| | 0003 | Items do not compare; the exception handler asks the operator to find the correct document and refeed it. |
| Bits 4 through 31 | 0 | Reserved. |

Related Properties, Events, and Methods
DocComplete Event, RepassVerify Event repassRdr1CantReadCount, repassRdr2CantReadCount, repassRdr3CantReadCount Properties
Type: Short
This property defines the number of can't read characters (1Ah characters) in each code line for documents being refed during exception processing. There is a limit on the DP 1XXX MCR readers; they do not return leading edge can't read characters. The physical reader that maps to each of these properties is defined in the DP 250/500 Reader Initalization or the DP 1XXX Reader Initialization File. These properties are available to the application during the repassVerify Event.
Related Properties, Events, and Methods
rRdrMICRAnalogCantReadCount and rRdrMICRDigitaiCantReadCount Properties
repassRdr1CodeLine, repassRdr2CodeLine, repassRdr3CodeLine Properties
repassVerify Event repassRdr1 CodeLine, repassRdr2CodeLine, repassRdr3CodeLine Properties
Type: CString
These properties are available to the application during the repassVerify Event. This property defines the reader code line, including spaces (except for the DP 1XXX MICR readers) for the document being refed during exception processing. The maximum code line is 95 characters. The first character in the buffer is the leftmost character of the code line. Spaces are not compressed from the code line. See DP Character Sets for the ASCII values returned by the readers for valid characters.
DP 500--If you are using OCR readers and performing font switching, the following characters may be returned within the reader code line string. They mark the font switch occurrences.

| Value | Description |
| --- | --- |
| 0xC0 and 0xC1 | Font switch on string occurred. |
| 0xD0 through 0xD7 | Font switch on position occurred. |

Related Properties, Events, and Methods
repassRdr1CantReadCount, repassRdr2CantReadCount, repassRdr3CantReadCount Properties
repassVerify Event repassRdrDocLength Property
Type: Short
DP 250/500 only--This property describes the document length in 10ths of inches for documents being refed during exception processing. These properties are available to the application during the repassVerify Event. It is valid only if the reader options are set up to request the document length. This option can be set in the file
specified by the iRdrFontLoadPath Property. For the DP 30 and DP 1XXX, it will
always be zero.
Related Properties, Events, and Methods
iRdrFontLoadPath Property, repassVerify Event repassRdrDocStatus Property
This is a reserved field.

**Start* Properties--Start Up**
The Start* properties are available after the OCX is loaded. The following topics
describe the Start* properties:
StartSorterType Property
StartState Property

StartSorterType Property
Type: Short
This property informs the application which type of sorter is active (connected to the OCX).

| Value | Description |
|---|---|
| 0 | Not connected |
| 1 | DP 35 |
| 2 | DP 250 |
| 3 | DP 500 |
| 4 | DP 1150 |
| 5 | DP 1825 |

Related Properties, Events, and Methods
StartState Property

StartState Property
Type: Short
This property indicates the state of the sorter interface before any methods are
invoked by the application.

| Value | Description |
|---|---|
| 1 | ST_POWEREDOFF--the DP sorter is powered off. |
| 2 | ST_IDLE--the DP sorter is already powered up and the previous application disconnected in ST_IDLE. Issuing the PowerUp Method results in an immediate PoweredUp Event. |
| 3 | ST_DEAD--the DP sorter is not usable, and the application should terminate. |

This property enables the application to bypass the power up screen if the track is
already powered up. It is available immediately upon program load and prior to the
PoweredUp Event.
Related Properties, Events, and Methods

None.

**T\* Properties-Track Nondocument Commands**
T\* properties are set by the application prior to issuing a nondocument command.
The following topics describe the t\* properties:
tDspWriteLine1 and tDspWriteLine2 Properties
tImgEOFAnnotation Property
tMfilmHorizontalAnnotate Property
tMfilmLength Property
tMfilmLengthDP1X00Spool Property
tMfilmOptions Property
tMfilmSlewLength Property
tMfilmVerticalAnnotate Property tDspWriteLine1 and tDspWriteLine2 Properties
Type: CString
DP 30 only--The display write lines are strings set by the application that contain the data to be written to the DP 30 display panel. The numbers 1 and 2 correspond to the first and second lines of the display. The character data of this string is left justified. If more than 16 characters are referred to by these properties, only the first 16 characters are used. If fewer than 16 characters are referred to, trailing spaces are assumed.
Related Propenies, Events, and Methods
None tImgEOFAnnotation Property
Type: CString
The application sets this property to define the annotation placed in the header record of the EOF file when a EOF is created as a result of the ImageEndOfFile Method. The header record maximum size is 128 bytes. This property is only valid in the Ready State on all sorters.
Related Properties, Events, and Methods
ImageEndOf File Method tMfilmHorizontalAnnotate Property
Type: CString
The application sets this property to define a horizontal alphanumeric annotation for the microfilm when a MFilmHorizontalAnnotate Method is issued. Valid character codes are 20h to 5Fh. Refer to the Character Codes and CAPI Device Characters topic for further information.
DP 250/500--Up to 16 characters can be placed on the film.
DP 1XXX--Up to 12 alphanumeric characters (lefters, numbers and spaces) can be placed on the film. Characters are first validated, and any invalid characters are changed to a question mark "?" before being placed on the film. This property is only valid in the Ready State.
Related Properties, Events, and Methods tMfilmOptions Property, MFilmHorizontalAnnotate Method tMfimLength Property
Type: Short
This property defines the length of microfilm remaining in inches. It is set by the track control after the MFilmGetFilmLengthComplete Event is fired as a response to the MFilmGetLength Method.
DP 1XXX--This property is only valid in the Ready State.
Related Properties, Events, and Methods
tMfimLengthDP1X00Spool Property, MFilmGetFilmLengthComplete Event, MFilmGetLength Method tMfilmLengthDP1X00Spool Property
Type: Short
This property is available only on the DP 1XXX, and is valid only in the Ready State. A DP 1XXX reader sorter is equipped with a large spool of film. At 1000 feet in length, this large spool is more than four times the size of a standard spool. The large spool is cut into four or more smaller, standard-sized spools (200 feet) during film development. The MFilmSkip event indicates that a length of microfilm has passed that equals the length of a standard spool. The film slews automatically for four feet to separate the standard spools on the large spool. The application can place a human-readable horizontal annotation on the film at this time. Start flow must be issued by the application to resume flow. This property defines the length of microfilm remaining in inches on the large spool. It is set after the MFilmGetFilmLengthComplete event is fired as a response to the MFilmGetLength method. The tMfilmLength property defines the length of microfilm remaining in inches on the logical, standard-sized segment of the large spool. If the application issues an MFilmSlew method during the Ready state, a new standard size spool is started at that point. The DP 1XXX will not issue an MFilmSkip event for another 200 feet.
Related Properties, Events, and Methods
tMfilmLength Property, tMfilmSlewLength Property, MFilmGetFilmLengthComplete Event, MFilmSkip Event, FlowStart Method, MFilmGetLength Method tMfilmOptions Property
Type: Long
The application sets this property to control the microfilm process. Left and right can be applied to the microfilm with a horizontal or vertical microfilm annotation.
DP 1XXX--This property is only valid in the Ready State.
*Note: Bit 0 is the least signfficant bit.*

| Bit | Value | Description |
| --- | --- | --- |
| Bit 0 | 0 | Reserved |
| Bit 1--Left Blip Active | 1 | Apply the left blip to the microfilm |
| | 0 | No left blip |

| | | |
|---|---|---|
| Bit 2--Right Blip Active | 1 | Apply the right blip to the microfilm |
| | 0 | No right blip |
| Bit 3--Large Horizontal Characters (DP 1XXX only) | 0 | Normal horizontal characters |
| | 1 | Human-readable characters |
| Bits 3 through 31 | 0 | Reserved |

Related Properties, Events, and Methods
tMfilmHorizontalAnnotate Property, tMfilmVerticalAnnotate Property, MFilmHorizontalAnnotate Method, MFilmVerticalAnnotate Method tMfilmSlewLength Property
Type: Short
The application sets this property to define the length microfilm to be slewed when the MFilmSlew Method is invoked.
DP 250/500--This property defines the length of microfilm to slew in inches.
DP 1XXX--The DP 1XXX document processor advances the microfilm a fixed length of 48 inches. This property is only valid in the Ready State.
Related Properties, Events, and Methods
MFilmSlewComplete Event, MFilmSlew Method tMfilmVerticalAnnotate Property
Type: CString
The application sets this property to define a vertical annotation for the microfilm when a MFilmVerticalAnnotate Method is issued. Refer to the Character Codes and CAPI Device Characters topic for further information
DP 250/500--Up to 9 numeric characters can be placed on the film.
DP 1XXX--Up to 12 alphanumeric characters (letters, numbers, and spaces) can be placed on the film. Characters are first validated, and any invalid characters are changed to a question mark "?" before being placed on the film. This property is only valid in the Ready State.
Related Properties, Events, and Methods
tMfilmOptions Property, MFilmVerticalAnnotate Method

**wAlert\* Properties--Warnings**
WAlert\* properties are available when the Warning Event is started. They are set by the document processor and read by the application.
The following topics describe the wAlert\* properties:
wAlert Property, wAlertEnglishText Property, wAlertPktsFull Property wAlert Property
Type: Short
The Warning Event is fired up to once per 1.5 seconds, if the warning context has changed or there is more than one warning. If there is more than one, the warning messages cycle through, one warning event fired after another. This property indicates the type of warning in effect. Create a message to display to the operator that indicates the event in effect. Do not use a dialog box that requires operator response. In general, these warnings do not apply to the DP 30, except where indicated.

| Warnings | Description |
|---|---|
| 0X0000 | No warning |
| 0X0001 | Image stop track |
| 0x0002 | Sensor dirty |
| 0x0003 | HSEM ribbon retry |
| 0x0004 | HSEM attention |
| 0x0005 | HSEM ribbon low |
| 0x0006 | HSEM cover open |
| 0x0007 | HSEM module up |
| 0X0008* | Document removed view 1 |
| 0X0009* | Document removed manual drop |
| 0X000A* | Document removed view 2 |
| 0X000B* | Microfilm cover open |
| 0X000C* | Microfilm drawer open |
| 0X000D* | Microfilm lamp life |
| 0X000E* | Microfilm film low |
| 0X000F* | View 2 window open |
| 0X0010 | DP 1XXX microfilm stopped for film skip |
| 0X0011* | MJE front ink low |
| 0x0012* | MJE rear ink low |
| 0x0013* | Clean front MJE |
| 0x0014* | Clean rear MJE |
| 0X01XX^ | Pocket XX full. This refers to either logical or physical pockets, depending on the setting of the FULLPOCKETINFO key in the DP Stacker Waterfall Pocket INI File. The message refers to only the first pocket (or pocket set) if more than one pocket (or pocket set) is full simultaneously. |

Legend
* Does not apply to the DP 1XXX
^ This is the only warning that applies to the DP 30. It is also available on all other sorters.

Related Properties, Events, and Methods
wAlertEnglishText Property, Warning Event wAlertEnglishText Property
Type: CString
This property is an English text description of the warning in effect. (The Warning Event is fired up to once per 1.5 seconds, if the warning context is changed and there is more than one warning.)
Related Properties, Events, and Methods
wAlert Property, Warning Event wAlertPktsFull Property

Type: Short
This property is valid during the Warning event. It is set (value=1) if there are currently any full pocket sets that are stopping document flow. This property gives the application more timely information about the state of any full pocket sets. The related wAlert property is updated during every Warning event but if there is more than one warning condition, its value changes with every Warning event. This makes it challenging for applications to use the warnAlert property alone to keep track of pocket full and pocket not full conditions.
Related Properties, Events, and Methods
wAlert Property, wAlertEnglishText Property, Warning Eyent

DP Track OCX Methods
The methods are commands the applications can issue to control the reader sorter. See the DP Track State Diagrams and Tables for information on when they are valid. The following topics describe DP track OCX methods.
CLICapture Method
DisplayLine Method
DocAccept Method
DocProcess Method
DocReject Method
FlowStart Method
FlowStop Method
GoIdle Method
GoReadyToProcess Method
ImageEndOf File Method
MakeReadyToFlow Method
MakeReadyToFlowTerminate Method
MergeFeed Method
MFilmGetLength Method
MFilmHorizontalAnnotate Method
MFilmSlew Method
MFilmVerticalAnnotate Method
MTREnter, MTRExit, MTRCommand Methods
NVMRead Method
NVMWrite Method
PowerDown Method
PowerUp Method
PrintLine Method
Recover Method
ResumeFeeding Method
StkResetPockets Method

CLICapture Method
*Note:This method applies to the DP 250/500 sorters only.*

CLIPath1 and CLIPath2 define the destination path for a document code line image that is stored to disk in a Windows .BMP file. If the CLIPathX is NULL, the CLIPathX is ignored.
This method may only be invoked for a document which has received the DocReadComplete Event but not the DocAccept Method. Based on the DP 500 document processor reader hardware, the following table describes the code line image data that is returned at the application-defined CLI paths.

| Reader1 | Reader2 | Reader3 | CLIPath1 | CLIPath2 |
|---------|---------|---------|----------|----------|
| CMC7/E13B | None | None | None | None |
| CMC7/E13B | None | CLI | CMC7/E13B | None |
| CMC7/E13B | OCR1 | None | OCR1 | None |
| CMC7/E13B | None | OCR2 | OCR2 | None |
| CMC7/E13B | OCR1 | OCR2 | OCR1 | OCR2 |
| CMC7/E13B | OCR1 | CLI | OCR1 | CMC7/E13B |
| Dual E13B | None | CLI | LowerE13B | None |
| Dual E13B | CLI | CLI | Upper E1 3B | LowerE13B |
| Dual E13B | OCR1 | CLI | OCR1 | LowerE13B |
| Dual E13B | OCR1 | OCR2 | OCR1 | OCR2 |

Parameters
CLIPath1 of type CString
CLIPath2 of type CString
Related Properties, Events, and Methods
CLICaptured Event, DocReadComplete Event, DocAccept Method

DisplayLine Method
DP 35--This method applies only to DP 35 sorters.
This method transfers the DspWriteLine1 parameter--a string containing the ASCII data--to the DP 35 display. This method is valid after the sorter is powered up. The data to be written to the DP 35 display is defined by the tDspWriteLine1 and tDspWriteLine2 Properties. The Line 1 corresponds to the top line of the display panel and Line 2 corresponds to the bottom line. The character data of this string is left justified. If more than 16 characters are referred to by these properties, only the first 16 characters are used. If fewer than 16 characters are referred to, trailing spaces are assumed.
Related Properties, Events, and Methods
tDspWriteLine1 and tDspWriteLine2 Properties

DocAccept Method
When the DocReadComplete Event is received, the application must issue either the DocAccept Method or DocReject Method. If the DocAccept method is invoked, the application must issue the DocProcess Method before the next DocAccept method.
DP 250/500--The DocAccept method causes the document to move from the view 2 station to the print hold station. A DocReadComplete event may then occur for the next document. This method is valid in the ReadComplete state.

DP 30 and DP 1XXX--The DocAccept method does not affect the document in the DP sorter. The DocProcess Method must be issued before the next document read complete event occurs.
Related Properties, Events, and Methods
DocComplete Event, DocReadComplete Event, DocProcess Method, DocReject Method, DocAccept Method

DocProcess Method
This method is issued for each accepted document. The p* properties set by the application before the DocProcess method is invoked determine the document processing.
The following sequence is possible.
    DocReadComplete Event, DocAccept Method, DocProcess Method....
Repeat
Because of the view 2 station and print hold station on the DP 250/500, the following sequence is possible on the DP 250/500:
    DocReadComplete Event, DocAccept Method, DocReadComplete Event,
    DocProcess Method, DocAccept Method, DocProcess Method.... Repeat
Use this second sequence for processing document pairs (stub, check, stub, check sequence) on the DP 250/500. This method is valid in the Process state.
Related Properties, Events, and Methods
P* Properties--Process Document, DocReadComplete Event, DocAccept Method, DocProcess Method

DocReject Method
DP 250/500 only-When the DocReadComplete Event is received, the applicaton must issue a DocAcccept Method or DocReject Method. If the DocReject Method is invoked, the DocRejected Event is fired when the document is rejected. This method is valid in the ReadComplete state. The DocReject method is performed when the operator removes the document from the view 2 station. Prompt the operator to remove the view 2 document when DocReject is issued. Remove the prompt when the DocRejected Event is fired.
Related Properties, Events, and Methods
DocReadComplete Event, DocReiected Event, DocAccept Method, DocProcess Method

FlowStart Method
This method starts documents flowing from an entry station. The entry station is defined by the entry mode parameter. This method is valid in the Ready state.
DP 30
The merge modes (values 4 and 5) do not apply.
DP 1XXX
The MFilmSkip Event may halt document flow. Also, the manual drop modes (values 2 and 3) do not apply to high speed sorters.
The sorter hardware requires that the Start/Stop button or Start/Stop bar be pressed on the sorter before flow can start. After receiving the FlowStart method, the Track Control Exception Handler will direct the operator to press the Start/Stop button or bar to begin document flow.

Example

The following is a Visual Basic coding example for autofeed mode.

Dpocx.FlowStart 0

The following table defines the entry modes.

| Value | Entry Mode | Description |
| --- | --- | --- |
| 0 | Autofeed | Sets the document processor to flow documents from the document feeder. Once issued, documents continue to flow from the feeder until a FlowStopped Event, BlackBand Event, HopperEmpty Event, MFilmSkip Event, or an exception switches the entry station to the manual feeder. |
| 1 | Singlefeed | Sets the document processor to feed a single document from the feeder. Once issued, a document is fed through the reader. Once the document is accepted, a FlowStopped Event indicates completion of the single feed operation. A FlowStopped event, BlackBand Event, HopperEmply Event, MFilmSkip Event, or an exception switching the entry station to the manual feeder may occur instead of the DocReadComplete Event. |
| 2* | Autodrop | Sets the document processor to enter documents from the manual drop station. Once issued, documents continue to be accepted from the manual drop station until a FlowStopped event (caused by invoking the FlowStop Method occurs. |
| 3* | Singledrop | Sets the document processor to enter a single document from the manual drop station. Once issued, a document is fed through the reader. Once the document is accepted, a FlowStopped Event indicates completion of the single feed operation. A FlowStopped event (caused by invoking the FlowStop Method) may occur instead of the DocReadComplete Event. |
| 4** | Singlemerge | Sets the document processor to enter a single document from the secondary feeder. Once issued, a document is fed through the reader. Once the document is accepted and processed, a FlowStopped , BlackBand, HopperEmpjy, or MfilmSkip Event indicates completion of the single feed operation. |
| 5** | Automerge | Sets the document processor to flow documents from the secondary feeder. Once issued, documents continue to flow from the feeder until a FlowStopped Event, HopperEmpty Event , BlackBand Event, MFilmSkip Event, or an excepton switches the entry station to the manual feeder. |

Legend

\* Does not apply to DP 1XXX sorters.
\*\* Does not apply to DP 30 sorters
Related Properties, Events, and Methods
BlackBand Event, DocReadComplete Event, ExceptionComplete Event,
FlowStopped Event, HopperEmpty Event, MFilmSkip Event, FlowStop Method

FlowStop Method
This method stops document flow and the current entry mode. It is valid in the Entering state.
Applications must continue to process documents until a FlowStopped Event is received. The application can expect to receive codelines for up to two documents on the DP 500 and six documents on the DP 1XXX before the track stops.
DP 30, DP 250/500--If the manual drop station is not processing a document when FlowStop is invoked, the manual drop is stopped and a FlowStopped Event is reported.
DP 1XXX--If a non-document exception is in progress, the FlowStop method terminates the exception, then returns the system to the Ready state.
Related Properties, Events, and Methods
Flow, FlowStart Method

GoIdle Method
This method prepares the sorter for deactivation or new initialization. The Idle Event is fired when the GoIdle Method is complete. This occurs only when all outstanding documents are processed and completed with DocComplete Events and the PrintLine Methods and the nondocument methods (such as MFilmGetLength Method and ImageEndOfFile Method) are completed. This method is valid in the Ready state.
Related Properties, Events, and Methods
DocComplete Event, Idle Event, ImageEndOfFile Method, MFilmGetLength Method, MFilmHorizontalAnnotate Method, MFilmSlew Method, MFilmVerticalAnnotate Method, PrintLone Method

GoReadyToProcess Method
This method initializes the sorter for document processing. Readers, encoders, endorsers, waterfall pockets, image devices, and run time parameters are initialized. Initialization is defined by the I\* Properties-Initializabgn. If a device does not require reinitialization, this reinitialization is not performed. While the machine is initializing, the Readying Event is fired once per second to show progress. This method is valid in the Idle state.
Related Properties, Events, and Methods
I\* Properties--Initialization, Readying Event

ImageEndOfFile Method
This method forces the storage of all currently buffered images and the closing of all image files. If the IDX storage is in effect, the EOF File is created for all previously opened batches. Its primary purpose is to allow applications to perform end-of-job functions. End of batch operations can be performed by using the plmgOptions Property flags. This method is valid in the Ready state before the GoIdle Method is invoked.
Related Properties, Events, and Methods
plmgOptions Property, tlmgEOFAnnotation Property, GoIdle Method

MakeReadyToFlow Method
DP 30--This method does not apply to the DP 30.
MakeReadyToFlow is a non-document method for all sorters except the DP 30 that can be issued by the application in the Ready state. The MakeReadyToFlow method causes Track Control to check for and correct conditions which inhibit the sorter from flowing. Flow does not actually start. The excepton handler prompts the operator to correct any conditions preventing flow from starting.
*Note: Use of this method is neither mandatory, nor recommended. It is designed for use in systems interfaced to hosts which require a separate "Ready To Flow" logical state.*
When all conditions inhibiting flow have been corrected, the MakeReadyToFlowComplete event is issued to the application. At this point the application still must send the FlowStart method to actually start flowing documents.
Related Propeties, Events, and Methods
MakeReadyToFlowTerminate Method, MakeReadyToFlowComplete Event

MakeReadyToFlowTerminate Method
DP 30--This method does not apply to the DP 30.
MakeReadyToFlowTerminate method ends the Make Ready To Flow operation that is currenfly in progress. Track Control fires the MakeReadyToFlowComplete Event in response to this method.
Related Propeties, Events, and Methods
MakeReadyToFlow Method, MakeReadyToFlowComplete Event

MergeFeed Method
This method directs the document flow from the secondary feeder for the MergeCount number of documents. It may be issued any time during the Entering state after a FlowStart Method has been issued. If MergeFeed is issued before the merge feeding completes for a prior MergeFeed command, MergeCount is added to the remaining documents to be merged.
Applications DO NOT have to stop flow before or start flow after issuing this method. This transition from feeding to merging and back to to feeding is performed by track control.
Example
The following example feeds one document from the secondary feeder.
    Dpoxc.MergeFeed 1
DP 1XXX--Only a MergeCount value of one document can be selected. Only one MergeFeed command can be issued every six documents.
Parameters
MergeCount of type Short

Related Properties, Events, and Methods
iXcpSecFdrIdentify Property, FlowStart Method

MFilmGetLength Method
This method returns the amount of microfilm remaining in inches. When the operation is complete, the MFilmGetFilmLengthComplete Event is fired. This method is valid in the Ready state for all sorters except the DP 30, or the Entering state for DP 500 sorters only.
Related Properties, Events, and Methods
tMfilmLength Property, MFilmGetFilmLengthComplete Event

MFilmHorizontalAnnotate Method
This method puts a horizontal annotabon on. microfilm. This can be issued in the Ready state for all sorters except the DP 30, or the Entering state for DP 500 sorters only.
Related Propetiles, Events, and Methods
tMfilmHorizontalAnnotate Property, tMfilmOptions Property

MFilmSlew Method
This method advances the microfilm in preparation of removal from the microfilmer. When the operation is complete, the MFilmSlewComplete event is fired. This method is valid in the Ready state for all sorters except the DP 30 or the Entering state for DP 500 sorters only.
DP 250/500--The distance slewed is determined by the tMfilmSlewLength property.
DP 1XXX--The DP 1XXX document processor advances the microfilm a fixed length of 48 inches. The tMfilmSlewLength Property is ignored.
Related Properties, Events, and Methods
tMfilmSlewLength Property, MFlmSlewComplete Event

MFilmVerticalAnnotate Method
This method puts a vertical annotation on the microfilm and is valid in the Ready state for all sorters except the DP 30 or the Entering state for DP 500 sorters only.
Related Properties, Events, and Methods
tMfilmVerticalAnnotate Property, tMfilmOptions Property

MTREnter, MTRExit, MTRCommand Methods
These are methods reserved for Unisys Engineering.'

NVMRead Method
DP 250/500 only--This method is designed for use with Visual Basic and Visual Foxpro. (These development tools do not allow pointer types.) C++ and Delphi32 users should use the cfgNVMBase Property. NVMRead reads 4 bytes of data from NVM at NVMOFFSET. The 4 bytes of data is returned by NVMRead as a Long. NVMOFFSET is described in increments of 4 bytes. A value of 1 references bytes 4 through 7 in NVM. The NVM area is 10 K in length. Attempting to write data beyond the 10 K user section results in a processor access violation.

Example
The following example reads the first 4 bytes of NVM and stores them in NVMDATA.
    NVMDATA - DP0CX1.NVMRead 0
Parameters
NVMOFFSET of type Long
Reurns
Long
Related Properties, Events, and Methods
cfgNVMBase Property
NVMWrite Method

NVMWrite Method
DP 250/500 only--This method is designed for use with Visual Basic and Visual Foxpro. (These tools do not allow pointer types.) C++ and Delphi32 users should use the cfgNVMBase Property.
NVMWrite writes NVMDATA to NVM at the offset specified by NVMOFFSET. Attempting to write data beyond the 10 K user section results in a processor access violation.
Example
The following example writes a value of 1 at the first 4 bytes of NVM.
    Call DP0CX1.NVMWrite (1, 0)
Parameters
NVMDATA of type Long
NVMOFFSET of type Long
Related Properties, Events, and Methods
cfgNVMBase Property, NVMRead Method

PowerDown Method
When PowerDown is complete, the PoweredDown Event is fired. This method is valid in the Idle state.
DP 30--When the application issues a PowerDown, the system software disables all communicabon with the DP 30.
DP 250/500--When the application issues PowerDown, the system software powers down the DP 250 or DP 500 track and master printer. If the application terminates from the Idle state without issuing PowerDown, the track remains powered up.
DP 1XXX--When the application issues a PowerDown, the exception handler may prompt the operator to manually power off the sorter.
Related Properties, Events, and Methods
PowerUp Method, PoweredDown Event

PowerUp Method
DP 30--When the application issues PowerUp, the system software communication with the DP 30 is enabled. No errors are reported to the exception handler (EXCEPT.EXE).
DP 250/500--When the application issues PowerUp, the system software powers up the DP 250 or DP 500 track and master printer. ff the application previously terminated without issuing PowerDown, the transport is not reloaded and the PoweredUp Event is issued immediately. This is an example of the application connecting in the Idle state.

DP 1XXX--When the application issues PowerUp, the system software powers up the sorter track. If the application previously terminated without issuing PowerDown, the transport is not reloaded and the PoweredUp Event is issued immediately. This is an example of the application connecting in the Idle state.

All sorters
If the power up results in a power on confidence failure, the exception handler is invoked. PowerUp can take as long as 100 seconds for the DP 250/500 and 900 (15 minutes) for the DP 1XXX, depending on the devices filled. While PowerUp is occurring, the PoweringUp Event fires up once per second to show progress. When PowerUp is complete, the PoweredUp Event is fired.

Related Properties, Events, and Methods
PoweredUp Event, PoweringUp Event, PowerDown Method

PrintLine Method
*Note: This method dbes not apply to the DP 1XXX sorters.*
This method transfers the PrtWriteLine parameters string containing the data to be wdften to the printer to the master printer for printing. This method is valid after the sorter is powered up. The maximum number of characters on a line is MAXCHAR. MAXCHAR is 30 characters for the DP 30 printer, and is 40 characters for the DP 250/500 master printer. If PrtWriteLine exceeds MAXCHAR, only the first MAXCHAR characters are used. If fewer than MAXCHAR characters are referred to, trailing spaces are assumed.

Parameters
PrtWriteLine of type Cstring

Related Properties, Events, and Methods
Goldle Method

Recover Method
*Note: This method applies to the DP 250 and DP 500 sorters only.*
This method transfers the system from Idle state to Recovery state. If the previous run ended abnormally with documents in the track, the exception handler (EXCEPT.EXE) is invoked to reprocess the outstanding documents. Once the recovery is completed, the RecoveryComplete Event is fired. The application can then use the recDocIndex Property and recDocCount Property to examine the C* Properties-Document Completion for the documents processed previous to the abnormal termination. This method is valid in the Idle state.

Related Properties, Events, and Methods
C* Properties-Document Completion, Rec* Properties--Recovery from Power Failure, RecoveryComplete Event

ResumeFeeding Method
If the ecManualDropSwitch Property is set to TRUE after an ExceptionComplete Event, it indicates that the document entry is switched to manual drop. The ResumeFeeding Method causes the document entry to switch from the manual drop station back to the application entry station. This method is valid in the Entering state. The operator should be allowed to process the documents which were removed from the track but did not appear in the error document list. These documents are entered in the manual drop also or can be placed back in front of the feeder. ResumeFeeding is equivalent to the following sequence:
FlowStop Method, FlowStopped Event, FlowStart Method with last application entry mode
DP 1XXX--This method is not needed for the DP 1XXX sorter, because the ecManualDropSwitch Property is never set to TRUE.
Related Properties, Events, and Methods
ecManualDropSwitch Property, ExceptionComplete Event, FlowStopped Event, FlowStart Method, FlowStop Method

StkResetPockets Method
This method is used to reset a waterfall pocket set back to its first physical pocket in the logical pocket set. See the DP Stacker Waterfall Pocket.INI File section for a description on how to define logical pocket sets. The parameter (LogicalPocketNumber) can select a single logical pocket set or all logical pockets sets (0=all logical pockets). This method is legal from the Ready state for all sorter types or while flowing for the DP30, DP250 and DP500 sorters. A typical scenario for using this method on all sorter types is as follows:
1. The application is in the Ready State.
2. The application issues the StkResetPockets method one or more times.
3. Track Control turns on the pocket lights for the physical pockets that have been reset.
4. The application prompts the operator to empty all the pockets that have flashing lights or that are full.
5. The operator empties the pockets and acknowledges the application prompt.
6. The application either issues the FlowStart or GoIdle method.
7. Track Control turns off the pocket lights for the-pockets that have been reset.
8. Logical sets that have been reset begin with the first physical pocket in the logical set.

The StkResetPockets method can also be used while flowing when the sorter type is a DP30, DP250 or DP500. These sorters have the ability to stop items in the track after they have been read and before they have been processed. A scenario for using this method while flowing is as follows:
1. The system is flowing documents.
2. The application reads a document and determines that this is a header ticket to a new batch. It also determines that a logical pocket set needs to be emptied.
3. The application issues the StkResetPockets method one or more times for the sets that need to be empted. This is done before issuing the DocProcess method for the header ticket. The documents are temporarily halted in the track.

4. Track Control turns on the pocket lights for the physical pockets that belong to the logical sets that have been reset.
5. The application prompts the operator to empty all the pockets that have flashing lights or that are full.
6. The operator empties the pockets and acknowledges the application prompt.
7. The application issues the DocProcess method for the header ticket that triggered the StkResetPockets method.
8. Track Control turns off the pocket lights for the pockets that have been reset.
9. Logical sets that have been reset begin with the first physical pocket in the logical set.

StkResetPockets can also be issued after first reaching the Ready State. This will assure that the track pockets are in a known state before a run begins.

Parameters
LogicalPocketNumber of type Short

Related Properties, Events, and Methods
DP Stacker Waterfall Pocket.INI File, pStkPocket Property, cStkPocket Properly, pStkWaterfallCascade Property, iStkSetLogicalPocketsPath Property, rPktSetNearFull Property, rPktSetsCantCascade1, rPktSetsCantCascade2 Properties

DP Track OCX Events
Events are signals from the track to the application that relay major events have occured and/or information is available. The following topics describe DP track OCX events.

BlackBand Event
CLICaptured Event
DocComplete Event
DocReadComplete Event
DocRejected Event
ExceptionComplete Event
ExceptionInProgress Event
FlowStopped Event
HopperEmpty Event
Idle Event
MachineDead Event
MakeReadyToFlowComplete Event
MFilmGetFilmLengthComplete Event
MFilmSkip Event
MFilmSlewComplete Event
MTRExited, MTREntered, MTRResponse Events
PoweredDown Event
PoweredUp Event
PoweringUp Event
Readying Event
ReadyToProcess Event
RecoveryComplete Event RepassVerify Event
StackerButtonPressed Event
Warning Eyent

BlackBand Event
This event indicates the transition from Entering state to Ready state. This occurs during a feed mode when a black band document enters the track and the iEntryStopOnBlackBand Property is set to TRUE.
DP 250/500--The black band item stops and can be removed from the view 1 station or be pocketed by starting the flow again.
DP 1XXX--The black band item must be accepted and processed by the application. No documents after the black band item are fed until the applicaton issues a FlowStart Method.
Related Properties, Events, and Methods
iEntryStopOnBlackBand Property, FlowStart Method

CLICaptured Event
DP 250/500 only--This event indicates that the CLI capture process is complete.
Related Properties, Events, and Methods
CLICapture Method

DocComplete Event
This event is fired when all document processing is completed for a document. The application should use the data associated with the C* Properties--Document Completion to store the data record associated with this document. Every DocProcess Method results in a DocComplete event. However, documents that are rejected by the DocReject Method do not receive a DocComplete event. Any documents for which a DocComplete is received between ExceptionProgress and ExceptionComplete events are documents involved in that excepton.
Related Properties, Events, and Methods
C* Properties--Document Completion, DocProcess Method, DocReject Method, ExceptionComplete Event, ExceptionInProgress Event

DocReadComplete Event
This event occurs when the reader code line data for a document is available for application processing. The R* Properties contain the reader code line results. The application must issue a Document Method or DocRegest Method before another DocReadComplete event occurs. No DocReadComplete event will be received after an ExceptionInProgress event has been received, until an Exception event is received.
Related Properties, Events, and Methods
R* Properties--Reader, DocAccept Method, DocReject Method, ExceptionComplete Event, ExceptionInProgress Event

DocRejected Event

DP 250/500 only--This event occurs when a DocReject Method is issued for a
document and the operator has removed the document from the view 2 station.
Related Properties, Events, and Methods
DocReject Method

ExceptionComplete Event
This event occurs when the exception processing is complete. The exception
handler (EXCEPT.EXE) releases its window focus and the application can take back
the window focus. The application receives DocComplete Events for all exception
items being reprocessed before the ExceptionComplete Event is fired. Ec*
Properties Exception are available after this event.
DP 30 and DP 250/500--If the feed mode is altered, the ecManualDropSwitch
Property is TRUE. A ResumeFeeding Method returns the track to flowing from the
application entry station.
Related Properties, Events, and Methods
ecManualDropSwitch Property, ExceptionInProgress Event, ResumeFeeding
Method

ExceptionInProgress Event
This event occurs when the on handler receives an exception. (The application will
have received DocComplete Events for all good items prior to the excepton.) The
window focus is shifted from the application to the exception handler. The
application must allow the exception handler to have the window focus. The
exception handler instructs the operator to refeed items that were not processed by
the sorter devices. It allows items to be hand-pocketed, or to be deleted if the
application allows it in the pXcoDeleteAllowed for that document. This event may
occur in any state except Powered Off. Ep* Properties--Exception in Progress are
available after this event.
Related Properties, Events, and Methods
Ep* Properties-Exception in Progress, ExceptionComplete Event,
pXcpDeleteAllowed Property

FlowStopped Event

This event indicates the transition from Entering state to Ready state. This occurs
during the entry mode when a single document operation (single feed or single drop)
is completed or a FlowStop Method is issued by the application. There are three
other types of events that cause document flow to stop: the BlackBand event, the
Hopper Empty event, and the MFilmSkip event.
Related Properties, Events, and Methods
BlackBand Event, FlowStart Method, FlowStop Method, HopperEmply Event,
MFilmSkip Event

HopperEmpty Event

This event indicates the transition from Entering state to Ready state. This occurs during the Entering state when there are no more documents in the primary or secondary feeder hopper.

Idle Event
This event occurs after the application issues the GoIdle Method and all outstanding device commands and DocComplete Events are completed. It indicates that the track is in Idle state. From Idle state, the following are allowed:
- PowerDown Method
- GoReadyToProcess Method
- Application termination, leaving the track power on

Related Properties, Events, and Methods
DocComplete Event, GoIdle Method, GoReadyToProcess Method, PowerDown Method

MachineDead Event
This event indicates that a nonrecoverable error occurred. Files should be closed, and the application must terminate. If the error persists, repair the machine.

MakeReadyToFlowComplete Event
The MakeReadyToFlowComplete event is given to the application when the MakeReadyToFlow method has completed or as an immediate response to a MakeReadyToFlowTerminate method. The MakeReadyToFlowComplete event will be given to the application under the following circumstances:
- When the sorter is in a condition where flow can begin immediately upon reception of the StartFlow Method. All operator interaction with the machine that is required to start document flow has been completed.
- After the MakeReadyToFlowTerminate Method is issued. This ends the operation begun by the MakeReadyToFlow Method.

Related Propeties, Events, and Methods
MakeReadyToFlow Method, MakeReadyToFlowTerminate Method

MFilmGetFilmLengthComplete Event
This event occurs after a MFilmGetLength Method is completed.

Related Properties, Events, and Methods
tMfilmLength Property, tMfilmLengthDP1X00Spool Property, MFilmGetLength Method

MFilmSkip Event
DP 1XXX only--This event occurs only on a DP 1XXX reader sorter that is equipped with a large spool of film. This large spool is four times the size of a standard spool and is cut into four smaller standard-sized spools during film development. This event indicates that a length of microfilm has passed that equals the length of a standard spool. The film slews automatically to separate the standard spools on the large spool. The application can place a human-readable horizontal annotation on the film at this time. Start flow must be issued by the application to resume flow. If the operator presses the film slew button on the DP 1XXX control panel while the sorter is idle, no event is sent to the application. In order to detect an operator-induced film slew, the application should determine the available amount of film via the MFilmGetLength method prior to starting flow.
Related Properties, Events, and Methods
MFilmGetLength Method, tMfilmLengthDP1X00Spool Property

MFilmSlewComplete Event
This event occurs after a MFilmSlew Method is completed.
Related Properties, Events, and Methods
tMfilmSlewLength Property, MFilmSlew Method

PoweredDown Event
This event indicates completion of the PowerDown Method. The track is in the Power Off state.
Related Properties, Events, and Methods
PowerDown Method

PoweredUp Event
This event indicates completion of the PowerUp Method. Once the PoweredUp Event is fired, the track is in Idle state and the Cfg*Properties--Configuration are available. After the PoweredUp event is fired, the configuration INI file is available.
Related Properties, Events, and Methods
Cfg* Properties--Configuration, PoweringUp Event, PowerUp Method

PoweringUp Event
This event occurs during the Power Up state. It is repeated at one second intervals while the track is powering up. It provides an indication that a track operation is in progress.
Related Properties, Events, and Methods
PowerUp Method

Readying Event
This event occurs during the GetReady state. It is repeated at one second intervals while the readers, image devices, and run time parameters are being initialized. It indicates that a track operation is in progress.
Related Properties, Events, and Methods
GoReadyToProcess Method

ReadyToProcess Event
This event indicates that the track is ready to process documents and is in the Ready state. In Ready state, document flow can be started or track device commands can be issued.
Related Properties, Events, and Methods
I*Properties--Initialization, GoReadyToProcess Method

RecoveryComplete Event
DP 250/500 only--This event indicates completion of the recovery process. Once the RecoveryComplete event is fired, the track is in Idle state. The application can use the recDocIndex Property and recDocCount Property to examine the C* Properties--Document Completion for the documents processed previous to the abnormal termination.
Related Properties, Events, and Methods
C* Properties--Document Completion, recDocCount Property, recDocIndex Property, Recover Method

RepassVerify Event
RepassVerify enables the application to override the default exception handler (EXCEPT,EXE) algorithm for handling repass documents. This event occurs during exception reprocessing. At the entry to the event handler, the following properties are available to the application:
- rRdr1CodeLine, rRdr2CodeLine, rRdr3CodeLine Properties
- rRdrDocStatus Property
- rRdr1CantReadCount, rRdr2CantReadCount, rRdr3CantReadCount Properties
- rRdrDocLength Property
- repassAppDocDIN Property
- repassRdr1CantReadCount, repassRdr2CantReadCount, repassRdr3CantReadCount Properties
- repassRdr1CodeLine, repassRdr2CodeLine, repassRdr3CodeLine Properties
- repassRdrDocLength Property
- repassRdrDocStatus Program The rRdr properties contain the original reader code lines and status. The repass properties contain the repass reader code lines. Based on the document code lines, the application sets the repassControl property to control the system's handling of the repass document. For the DP 1XXX only, the application must set the repassControl property and complete the repassVerify event handler in less than 20 msec.

*Note: It is possible to get more than one E_REPASSVERIFY event for a single document, since the document could be refed again if another exception occurs with the document.*

Related Properties, Events, and Methods
rRdr1CantReadCount, rRdr2CantReadCount, rRdr3CantReadCount Properties, rRdr1CodeLine, rRdr2CodeLine, rRdr3CodeLine Properties, rRdrDocLength Property, rRdrDocStatus Property, repassAppDocDIN Property, repassControl Program, repassRdr1CantReadCount, repassRdr2CantReadCount, repassRdr3CantReadCount Properties, repassRdr1CodeLine, repassRdr2CodeLine, repassRdr3CodeLine Properties
repassRdrDocLength Property, repassRdrDocStatus Property

StackerButtonPressed Event

DP 250/500 only--This event indicates that a button on the stacker was pressed. The application can treat this as a keyboard stroke. Typically, this is used to start and stop the track.

Warning Event

This event fires once every 1.5 seconds. Warning events rotate through a queue of active warnings. For example, if logical stacker 1 is full and the microfilm cover is open, the warning event alternates from stacker 1 full to microfilm cover open. The application should display the warning to the operator.

Related Properties, Events, and Methods wAlert Property, wAlertEnglishText Property, wAlertPktsFull Property

What is claimed is:

1. A document processing system with a generalized programming interface for application programs, wherein other instances of the generalized programming interface are functionable with application programs of other document processing systems that include document processors having different capabilities and interfaces, comprising:

a first document processor having a first set of capabilities that are accessible via a first set of command codes;

an object interface having properties, methods, and events for the first document processor, and having properties, methods, and events for a second document processor having a second set of capabilities; and a track driver coupled to the first document processor and to the object interface, configured and arranged to interface with the first document processor and provide selected ones of the first set of command codes to the first document processor in response to methods initiated via the object interface, and in response to status codes returned from the first document processor, report events to an application program via the object interface.

2. The system of claim 1, wherein the properties have associated values and the track driver is configured to update values of predetermined ones of the properties in response to the status codes from the first document processor.

3. The system of claim 2, wherein the first document processor is configured and arranged to send a code indicative of a type of document processor, the type indicative of the first set of capabilities, and the track driver is configured and arranged to set a value for a property indicative of the type of document processor.

4. The system of claim 2, wherein the object interface is configured and arranged to include a first method to initiate processing documents by the first document processor.

5. The-system of claim 4, wherein the object interface is configured and arranged to include a property having a value to select whether to encode data on a document.

6. The system of claim 4, wherein the object interface is configured and arranged to include a property having a value to select whether to automatically recognize a courtesy amount on a document.

7. The system of claim 4, wherein the object interface is configured and arranged to include a property having a value to select whether to microfilm a document.

8. The system of claim 4, wherein the object interface is configured and arranged to include a property having a value to select whether to stamp a document.

9. The system of claim 4, wherein the object interface is configured and arranged to include a property having a value for selecting whether to encode data on a document.

10. The system of claim 9, wherein the object interface is configured and arranged to include a property having a value to specify the data to encode on the document.

11. The system of claim 4, wherein the object interface is configured and arranged to include properties having values to select whether to encode data on a document, automatically recognize a courtesy amount on a document, microfilm a document, stamp a document, and encode data on a document.

12. The system of claim 4, wherein the object interface is configured and arranged to include a first event to report when the first document processor has completed processing all documents, and the track driver is configured and arranged to report the first event in response to a predetermined status code from the first document processor.

13. The system of claim 4, wherein the object interface is configured and arranged to include a second method to initiate feeding of documents in the first document processor and a third method to stop the first document processor from feeding documents.

14. A document processing system with a generalized programming interface for application programs, wherein other instances of the generalized programming interface are functionable with application programs of other document processing systems that include document processors having different capabilities and interfaces, comprising:

a first document processor having a first set of capabilities that are accessible via a first set of command codes;

a data processing system having an input/output port and including an object interface having properties, methods, and events for the first document processor, and having properties, methods, and events for a second document processor having a second set of capabilities; and a track driver coupled to the first document processor via the input/output port and to the object interface, configured and arranged to interface with the first document processor and provide selected ones of the first set of command codes to the first document processor in response to methods initiated via the object interface, and in response to status codes returned from the first document processor, report events to an application program via the object interface.

15. The system of claim 14, wherein the first document processor includes an image subsystem.

16. The system of claim 14, wherein the data processing system includes a system bus and an interface board coupled to the system bus, and the track driver and the first document processor are coupled to the interface board.

17. The system of claim 14, wherein the properties have associated values and the track driver is configured to update values of predetermined ones of the properties in response to the status codes from the first document processor.

18. The system of claim 17, wherein the first document processor is configured and arranged to send a code indicative of a type of document processor, the type indicative of the first set of capabilities, and the track driver is configured and arranged to set a value for a property indicative of the type of document processor.

19. The system of claim 17, wherein the object interface is configured and arranged to include a first method to initiate processing documents by the first document processor.

20. The system of claim 19, wherein the object interface is configured and arranged to include a property having a value to select whether to encode data on a document.

21. The system of claim 19, wherein the object interface is configured and arranged to include a property having a value to select whether to automatically recognize a courtesy amount on a document.

22. The system of claim 19, wherein the object interface is configured and arranged to include a property having a value to select whether to microfilm a document.

23. The system of claim 19, wherein the object interface is configured and arranged to include a property having a value to select whether to stamp a document.

24. The system of claim 19, wherein the object interface is configured and arranged to include a property having a value to select whether to encode data on a document.

25. The system of claim 24, wherein the object interface is configured and arranged to include a property having a value to specify the data to encode on the document.

26. The system of claim 19, wherein the object interface is configured and arranged to include properties having values to select whether to encode data on a document, automatically recognize a courtesy amount on a document, microfilm a document, stamp a document, and encode data on a document.

27. The system of claim 19, wherein the object interface is configured and arranged to include a first event to report when the first document processor has completed processing all documents, and the track driver is configured and arranged to report the first event in response to a predetermined status code from the first document processor.

28. The system of claim 19, wherein the object interface is configured and arranged to include a second method to initiate feeding of documents in the first document processor and a third method to stop the first document processor from feeding documents.

29. A method for operating a document processing system, comprising the steps of:

setting in an object interface values of properties that are associated with the document processing system, the object interface additionally having properties of another different document processing system;

invoking methods for controlling operations of the document processing system, wherein the methods are defined in the object interface, and the object interface additionally includes methods for controlling different operations of the different document processing system; and processing events generated by the document processing system and reported via the object interface, the object interface additionally having event definitions for the different document processing system.

30. The method of claim 29, further comprising the step of updating values of predetermined ones of the properties in response to status codes from the document processing system.

31. The method of claim 30, further comprising the step of setting a value for a property that is indicative of a type of document processor.

32. The method of claim 30, further comprising the step of invoking a first method to initiate processing documents by the document processing system.

33. The method of claim 32, further comprising the step of setting a value for a property for selecting whether to encode data on a document.

34. The method of claim 32, further comprising the step of setting a value for a property for selecting whether to automatically recognize a courtesy amount on a document.

35. The method of claim 32, further comprising the step of setting a value for a property for selecting whether to microfilm a document.

36. The method of claim 32, further comprising the step of setting a value for a property for selecting whether to stamp a document.

37. The method of claim 32, further comprising the step of setting a value for a property for selecting whether to encode data on a document.

38. The method of claim 37, further comprising the step of setting a value for a property for specifying the data to encode on the document.

39. The method of claim 32, further comprising the steps of setting a value for a property for selecting whether to encode data on a document, setting a value for a property for selecting whether to automatically recognize a courtesy amount on a document, setting a value for a property for selecting whether to microfilm a document, setting a value for a property for selecting whether to stamp a document, and setting a value for a property for selecting whether to encode data on a document.

40. The method of claim 32, further comprising the step of reporting an event when the document processing system has completed processing all documents.

41. The method of claim 32, further comprising the steps of:

invoking a method in the object interface to initiate feeding of documents; and invoking a method in the object interface to stop feeding documents.

42. An apparatus for operating a document processing system, comprising:

means for setting in an object interface values of properties that are associated with the document processing system, the object interface additionally having properties of another different document processing system;

means for invoking methods for controlling operations of the document processing system, wherein the methods are defined in the object interface, and the object interface additionally includes methods for controlling different operations of the different document processing system; and means for processing events generated by the document processing system and reported via the object interface, the object interface additionally having event definitions for the different document processing system.

43. A method for establishing a programming environment for a plurality of document processing systems, each document processing system having a document processor with different capabilities that are accessible via a different set of command codes, comprising the steps of:

defining an object interface having properties, methods, and events that are descriptive of the document processors;

establishing a plurality of respective instances of the object interface for the plurality of document processing systems, the instances of the object interface having a common programming interface for implementing application programs;

coupling a plurality of respective track drivers to the instances of the object interface, each track driver responsive to methods initiated from the respective instance of the object interface, and configured and arranged to provide predetermined command codes to the document processor and report events back to the object interface.

* * * * *

UNITED STATES PATENT AND TRADEMARK OFFICE
CERTIFICATE OF CORRECTION

PATENT NO. : 6,546,396 B1 Page 1 of 1
DATED : April 8, 2003
INVENTOR(S) : Joseph D. Borkowski et al.

It is certified that error appears in the above-identified patent and that said Letters Patent is hereby corrected as shown below:

<u>Title page,</u>
Item [75], should read:
-- Inventors     Joseph D. Borkowski
                Stephen M. Russell
                Thomas L. Bondy
                Weston J. Morris
                Craig F. Lapan --

Item [22], should read:
-- Filed:       December 18, 1997 --

Signed and Sealed this

Nineteenth Day of August, 2003

JAMES E. ROGAN
*Director of the United States Patent and Trademark Office*